US009736304B1

(12) United States Patent
Neuer, III et al.

(10) Patent No.: US 9,736,304 B1
(45) Date of Patent: *Aug. 15, 2017

(54) FORECASTING AND SCHEDULING CAMPAIGNS INVOLVING SENDING OUTBOUND COMMUNICATIONS THAT GENERATE INBOUND COMMUNICATIONS

(71) Applicant: Noble Systems Corporation, Atlanta, GA (US)

(72) Inventors: Ellwood I. Neuer, III, Newnan, GA (US); Jason P. Ouimette, Berkeley Lake, GA (US); Christopher S. Haggerty, Atlanta, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/423,847

(22) Filed: Feb. 3, 2017

Related U.S. Application Data

(63) Continuation of application No. 15/349,392, filed on Nov. 11, 2016, now Pat. No. 9,600,789, which is a
(Continued)

(51) Int. Cl.
*H04M 3/00* (2006.01)
*H04M 5/00* (2006.01)
(Continued)

(52) U.S. Cl.
CPC ....... *H04M 3/5158* (2013.01); *H04M 3/5191* (2013.01); *H04M 3/5238* (2013.01); *H04M 2203/402* (2013.01)

(58) Field of Classification Search
CPC ....... G10L 15/00; G06Q 10/06; H04M 3/323; H04M 3/36; H04M 3/4217; H04M 3/4285;
(Continued)

(56) References Cited

U.S. PATENT DOCUMENTS 5,592,543 A 1/1997 Smith et al.
5,594,791 A 1/1997 Szlam et al.
(Continued)

OTHER PUBLICATIONS

Noble Systems Corporation, NobleWFM 2010.1.0 User Guide, Mar. 28, 2011, 324 pages, Atlanta, GA.
(Continued)

*Primary Examiner* — Khai N Nguyen

(57) ABSTRACT

Various embodiments of the invention provide methods, systems, and computer program products for generating a roster template used in scheduling agent resources to conduct a campaign involving sending outbound communications using a first channel of communication to generate inbound communications using a second channel of communication. Specifically, a forecast is generated establishing a success rate for generating an inbound communication using the second channel of communication as a result of sending an outbound communication using the first channel of communication and an average response time to receive the inbound communication. Further, the forecast identifies a number of inbound communications predicted to be received for the campaign. From the forecast, a number of agent resources needed to handle the inbound communications is identified and a roster template is generated that comprises shifts identifying agent resources to schedule based on the number of agent resources needed to handle the inbound communications.

18 Claims, 26 Drawing Sheets

Related U.S. Application Data continuation of application No. 15/211,502, filed on Jul. 15, 2016, now Pat. No. 9,531,881, which is a continuation of application No. 14/884,823, filed on Oct. 16, 2015, now Pat. No. 9,426,291.

(51) Int. Cl.
*H04M 3/51* (2006.01)
*H04M 3/523* (2006.01)

(58) Field of Classification Search
CPC ............ H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
See application file for complete search history.

(56) References Cited

U.S. PATENT DOCUMENTS

| | | | |
|---|---|---|---|
| 5,784,452 A | 7/1998 | Carney | |
| 5,911,134 A | 6/1999 | Castonguay et al. | |
| 5,978,465 A * | 11/1999 | Corduroy | H04M 3/51 379/243 |
| 6,587,831 B1 | 7/2003 | Obrien | |
| 6,822,945 B2 | 11/2004 | Petrovykh | |
| 6,850,613 B2 | 2/2005 | McPartlan et al. | |
| 6,859,529 B2 * | 2/2005 | Duncan | H04L 51/04 379/266.1 |
| 6,956,941 B1 * | 10/2005 | Duncan | H04L 51/04 379/265.01 |
| 6,970,829 B1 | 11/2005 | Leamon | |
| 7,650,293 B2 | 1/2010 | Kiran et al. | |
| 7,761,323 B2 | 7/2010 | Rafter et al. | |
| 7,873,157 B1 | 1/2011 | Sim | |
| 7,894,595 B1 | 2/2011 | Wu et al. | |
| 7,984,441 B2 | 7/2011 | Briccarello et al. | |
| 8,050,955 B2 | 11/2011 | Sarlay et al. | |
| 8,078,486 B1 | 12/2011 | McLean et al. | |
| 8,108,237 B2 | 1/2012 | Bourne et al. | |
| 8,126,134 B1 | 2/2012 | Fama | |
| 8,386,639 B1 | 2/2013 | Galvin | |
| 8,488,769 B1 * | 7/2013 | Noble, Jr. | H04M 3/5175 379/265.02 |
| 8,553,873 B1 * | 10/2013 | Noble, Jr. | H04M 3/5238 379/265.01 |
| 8,644,489 B1 * | 2/2014 | Noble, Jr. | H04M 3/5175 379/265.03 |
| 8,792,632 B2 | 7/2014 | Anisimov et al. | |
| 9,426,291 B1 * | 8/2016 | Ouimette | H04M 3/5158 |
| 9,531,881 B1 * | 12/2016 | Ouimette | H04M 3/5158 |
| 9,600,789 B1 * | 3/2017 | Neuer, III | H04M 3/5158 |
| 2002/0141561 A1 * | 10/2002 | Duncan | H04L 51/04 379/220.01 |
| 2003/0009520 A1 | 1/2003 | Nourbakhsh et al. | |
| 2003/0037113 A1 * | 2/2003 | Petrovykh | H04L 51/00 709/205 |
| 2003/0095652 A1 | 5/2003 | Mengshoel et al. | |
| 2004/0111310 A1 | 6/2004 | Szlam et al. | |
| 2007/0198322 A1 | 8/2007 | Bourne et al. | |
| 2008/0056165 A1 * | 3/2008 | Petrovykh | H04L 51/00 370/270 |
| 2008/0091501 A1 | 4/2008 | Tewari et al. | |
| 2009/0012760 A1 | 1/2009 | Schunemann | |
| 2009/0161849 A1 | 6/2009 | Minnich et al. | |
| 2010/0002863 A1 | 1/2010 | Loftus et al. | |
| 2010/0094878 A1 * | 4/2010 | Soroca | G06F 17/30035 707/748 |
| 2010/0172485 A1 | 7/2010 | Bourke et al. | |
| 2010/0257049 A1 | 10/2010 | Flombaum et al. | |
| 2011/0150208 A1 | 6/2011 | Stearns | |
| 2011/0194684 A1 | 8/2011 | Ristock et al. | |
| 2011/0258049 A1 * | 10/2011 | Ramer | G06F 17/30867 705/14.66 |
| 2012/0215640 A1 * | 8/2012 | Ramer | G06F 17/30867 705/14.55 |
| 2014/0376716 A1 * | 12/2014 | Petrovykh | H04L 51/00 379/266.01 |

OTHER PUBLICATIONS

Noble Systems Corporation, ShiftTrack Plus User Manual Version 6.0.5, Mar. 4 2015, 1280 Pages.

\* cited by examiner

Forecasted Communications for Each Time Interval

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Outbound SMS | 2,000 | | | | | | | |
| Inbound Calls | 0 | 1 | 23 | 47 | 11 | 8 | 2 | 0 |
| Inbound SMS | 13 | 87 | 63 | 43 | 21 | 20 | 15 | 9 |
|  | 11:00 a.m. | 11:15 a.m. | 11:30 a.m. | 11:45 a.m. | 12:00 p.m. | 12:15 p.m. | 12:30 p.m. | 12:45 p.m. |
| Outbound SMS | 2,000 | | | | | | | |
| Inbound Calls | 0 | 5 | 25 | 40 | 22 | 1 | 1 | 0 |
| Inbound SMS | 22 | 105 | 82 | 30 | 15 | 15 | 14 | 5 |
|  | 1:00 p.m. | 1:15 p.m. | 1:30 p.m. | 1:45 p.m. | 2:00 p.m. | 2:15 p.m. | 2:30 p.m. | 2:45 p.m. |
| Outbound SMS | 2,000 | | | | | | | |
| Inbound Calls | 1 | 3 | 20 | 50 | 8 | 5 | 4 | 1 |
| Inbound SMS | 23 | 123 | 42 | 31 | 15 | 20 | 15 | 8 |
|  | 3:00 p.m. | 3:15 p.m. | 3:30 p.m. | 3:45 p.m. | 4:00 p.m. | 4:15 p.m. | 4:30 p.m. | 4:45 p.m. |
| Outbound SMS | 3,000 | | | | | | | |
| Inbound Calls | 8 | 13 | 57 | 38 | 16 | 14 | 1 | 0 |
| Inbound SMS | 52 | 137 | 123 | 47 | 27 | 15 | 9 | 1 |
|  | 5:00 p.m. | 5:15 p.m. | 5:30 p.m. | 5:45 p.m. | 6:00 p.m. | 6:15 p.m. | 6:30 p.m. | 6:45 p.m. |
| Outbound SMS | 2,000 | | | | | | | |
| Inbound Calls | 0 | 2 | 23 | 50 | 12 | 3 | 1 | 1 |
| Inbound SMS | 30 | 78 | 53 | 47 | 35 | 23 | 8 | 4 |
|  | 7:00 p.m. | 7:15 p.m. | 7:30 p.m. | 7:45 p.m. | 8:00 p.m. | 8:15 p.m. | 8:30 p.m. | 8:45 p.m. |
| Outbound SMS | 2,000 | | | | | | | |
| Inbound Calls | 3 | 2 | 42 | 40 | 2 | 1 | 1 | 0 |
| Inbound SMS | 25 | 81 | 65 | 54 | 28 | 12 | 11 | 2 |

FIG. 9

Agents Needed for Each Type of Communication and Time Interval

| | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound Calls | 0 | 0 | 7 | 13 | 4 | 3 | 1 | 0 |
| Inbound SMS | 2 | 12 | 8 | 6 | 4 | 4 | 3 | 2 |
| | 11:00 a.m. | 11:15 a.m. | 11:30 a.m. | 11:45 a.m. | 12:00 p.m. | 12:15 p.m. | 12:30 p.m. | 12:45 p.m. |
| Inbound Calls | 0 | 1 | 7 | 11 | 8 | 0 | 0 | 0 |
| Inbound SMS | 3 | 14 | 11 | 4 | 3 | 3 | 3 | 1 |
| | 1:00 p.m. | 1:15 p.m. | 1:30 p.m. | 1:45 p.m. | 2:00 p.m. | 2:15 p.m. | 2:30 p.m. | 2:45 p.m. |
| Inbound Calls | 0 | 1 | 7 | 16 | 3 | 2 | 1 | 0 |
| Inbound SMS | 4 | 19 | 6 | 5 | 2 | 3 | 2 | 1 |
| | 3:00 p.m. | 3:15 p.m. | 3:30 p.m. | 3:45 p.m. | 4:00 p.m. | 4:15 p.m. | 4:30 p.m. | 4:45 p.m. |
| Inbound Calls | 3 | 4 | 19 | 12 | 5 | 5 | 0 | 0 |
| Inbound SMS | 8 | 21 | 19 | 7 | 4 | 2 | 1 | 0 |
| | 5:00 p.m. | 5:15 p.m. | 5:30 p.m. | 5:45 p.m. | 6:00 p.m. | 6:15 p.m. | 6:30 p.m. | 6:45 p.m. |
| Inbound Calls | 0 | 1 | 9 | 19 | 3 | 1 | 0 | 0 |
| Inbound SMS | 5 | 14 | 10 | 8 | 5 | 3 | 1 | 1 |
| | 7:00 p.m. | 7:15 p.m. | 7:30 p.m. | 7:45 p.m. | 8:00 p.m. | 8:15 p.m. | 8:30 p.m. | 8:45 p.m. |
| Inbound Calls | 1 | 1 | 16 | 15 | 1 | 0 | 0 | 0 |
| Inbound SMS | 4 | 15 | 12 | 10 | 4 | 2 | 1 | 0 |

FIG. 10

Surplus/Deficiency for Each Time Interval

7 Agents Scheduled for Morning Shift
10 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound Calls | 7 | 7 | 0 | -6 | 3 | 4 | 6 | 7 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound Calls | 7 | 6 | 0 | -4 | -1 | 7 | 7 | 7 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound Calls | 17 | 16 | 10 | 1 | 14 | 15 | 16 | 17 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound Calls | 14 | 13 | -2 | 5 | 12 | 12 | 17 | 17 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound Calls | 10 | 9 | 1 | -9 | 7 | 9 | 10 | 10 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound Calls | 9 | 9 | -6 | -5 | 9 | 10 | 10 | 10 |

FIG. 11

Surplus/Deficiency for Each Time Interval

7 Agents Scheduled for Morning Shift
10 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound SMS | 5 | -5 | -1 | 1 | 3 | 3 | 4 | 5 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound SMS | 4 | -7 | -4 | 3 | 4 | 4 | 4 | 6 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound SMS | 13 | -2 | 11 | 12 | 15 | 14 | 15 | 16 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound SMS | 9 | 4 | -2 | 10 | 13 | 15 | 16 | 17 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound SMS | 5 | -4 | 0 | 2 | 5 | 7 | 9 | 9 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound SMS | 6 | -5 | -2 | 0 | 6 | 8 | 9 | 10 |

Surplus/Deficiency for Each Time Interval

8 Agents Scheduled for Morning Shift
9 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound Calls | 8 | 8 | 1 | -5 | 4 | 5 | 7 | 8 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound Calls | 8 | 7 | 1 | -3 | 0 | 8 | 8 | 8 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound Calls | 17 | 16 | 10 | 1 | 14 | 15 | 16 | 17 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound Calls | 14 | 13 | -2 | 5 | 12 | 12 | 17 | 17 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound Calls | 9 | 8 | 0 | -10 | 6 | 8 | 9 | 9 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound Calls | 8 | 8 | -7 | -6 | 8 | 9 | 9 | 9 |

FIG. 13

Surplus/Deficiency for Each Time Interval

8 Agents Scheduled for Morning Shift
9 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound SMS | 6 | -4 | 0 | 2 | 4 | 4 | 5 | 6 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound SMS | 5 | -6 | -3 | 4 | 5 | 5 | 5 | 7 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound SMS | 13 | -2 | 11 | 12 | 15 | 14 | 15 | 16 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound SMS | 9 | 4 | -2 | 10 | 13 | 15 | 16 | 17 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound SMS | 4 | -5 | -1 | 1 | 4 | 6 | 8 | 8 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound SMS | 5 | -6 | -3 | -1 | 5 | 7 | 8 | 9 |

1410  1415  FIG. 14

Forecasted Communications for Each Time Interval

| | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Outbound SMS | 3,000 | | | | | | | |
| Inbound Calls | 0 | 6 | 11 | 53 | 27 | 23 | 14 | 4 |
| Inbound SMS | 23 | 154 | 97 | 50 | 27 | 32 | 19 | 15 |
| | 11:00 a.m. | 11:15 a.m. | 11:30 a.m. | 11:45 a.m. | 12:00 p.m. | 12:15 p.m. | 12:30 p.m. | 12:45 p.m. |
| Outbound SMS | 5,000 | | | | | | | |
| Inbound Calls | 3 | 10 | 32 | 93 | 44 | 27 | 12 | 9 |
| Inbound SMS | 35 | 278 | 134 | 89 | 47 | 45 | 41 | 26 |
| | 1:00 p.m. | 1:15 p.m. | 1:30 p.m. | 1:45 p.m. | 2:00 p.m. | 2:15 p.m. | 2:30 p.m. | 2:45 p.m. |
| Outbound SMS | 7,000 | | | | | | | |
| Inbound Calls | 5 | 21 | 47 | 123 | 97 | 18 | 7 | 4 |
| Inbound SMS | 44 | 467 | 243 | 52 | 56 | 47 | 42 | 22 |
| | 3:00 p.m. | 3:15 p.m. | 3:30 p.m. | 3:45 p.m. | 4:00 p.m. | 4:15 p.m. | 4:30 p.m. | 4:45 p.m. |
| Outbound SMS | 7,000 | | | | | | | |
| Inbound Calls | 8 | 13 | 67 | 107 | 96 | 17 | 9 | 5 |
| Inbound SMS | 52 | 503 | 232 | 47 | 50 | 40 | 39 | 10 |
| | 5:00 p.m. | 5:15 p.m. | 5:30 p.m. | 5:45 p.m. | 6:00 p.m. | 6:15 p.m. | 6:30 p.m. | 6:45 p.m. |
| Outbound SMS | 5,000 | | | | | | | |
| Inbound Calls | 5 | 14 | 23 | 101 | 43 | 24 | 17 | 3 |
| Inbound SMS | 30 | 78 | 53 | 47 | 35 | 23 | 8 | 4 |
| | 7:00 p.m. | 7:15 p.m. | 7:30 p.m. | 7:45 p.m. | 8:00 p.m. | 8:15 p.m. | 8:30 p.m. | 8:45 p.m. |
| Outbound SMS | 3,000 | | | | | | | |
| Inbound Calls | 3 | 7 | 21 | 45 | 30 | 17 | 10 | 5 |
| Inbound SMS | 25 | 149 | 123 | 60 | 28 | 12 | 11 | 9 |

FIG. 15

Agents Needed for Each Type of Communication and Time Interval

| | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound Calls | 0 | 2 | 3 | 15 | 10 | 9 | 5 | 2 |
| Inbound SMS | 3 | 21 | 13 | 7 | 5 | 6 | 3 | 3 |
| | 11:00 a.m. | 11:15 a.m. | 11:30 a.m. | 11:45 a.m. | 12:00 p.m. | 12:15 p.m. | 12:30 p.m. | 12:45 p.m. |
| Inbound Calls | 1 | 3 | 9 | 27 | 17 | 10 | 5 | 3 |
| Inbound SMS | 5 | 37 | 18 | 12 | 8 | 8 | 7 | 5 |
| | 1:00 p.m. | 1:15 p.m. | 1:30 p.m. | 1:45 p.m. | 2:00 p.m. | 2:15 p.m. | 2:30 p.m. | 2:45 p.m. |
| Inbound Calls | 2 | 7 | 15 | 40 | 32 | 6 | 2 | 1 |
| Inbound SMS | 7 | 72 | 37 | 8 | 9 | 7 | 6 | 3 |
| | 3:00 p.m. | 3:15 p.m. | 3:30 p.m. | 3:45 p.m. | 4:00 p.m. | 4:15 p.m. | 4:30 p.m. | 4:45 p.m. |
| Inbound Calls | 3 | 4 | 22 | 35 | 31 | 6 | 3 | 2 |
| Inbound SMS | 8 | 77 | 36 | 7 | 8 | 6 | 6 | 2 |
| | 5:00 p.m. | 5:15 p.m. | 5:30 p.m. | 5:45 p.m. | 6:00 p.m. | 6:15 p.m. | 6:30 p.m. | 6:45 p.m. |
| Inbound Calls | 2 | 6 | 9 | 38 | 12 | 7 | 5 | 1 |
| Inbound SMS | 5 | 14 | 10 | 8 | 5 | 3 | 1 | 1 |
| | 7:00 p.m. | 7:15 p.m. | 7:30 p.m. | 7:45 p.m. | 8:00 p.m. | 8:15 p.m. | 8:30 p.m. | 8:45 p.m. |
| Inbound Calls | 1 | 3 | 8 | 17 | 9 | 5 | 3 | 1 |
| Inbound SMS | 4 | 27 | 22 | 11 | 4 | 2 | 1 | 1 |

Surplus/Deficiency for Each Time Interval

18 Agents Scheduled for Morning Shift
20 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound Calls | 18 | 16 | 15 | 3 | 8 | 9 | 13 | 16 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound Calls | 17 | 15 | 9 | -9 | 1 | 8 | 13 | 15 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound Calls | 36 | 31 | 23 | -2 | 6 | 32 | 36 | 37 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound Calls | 35 | 34 | 16 | 3 | 7 | 32 | 35 | 36 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound Calls | 18 | 15 | 11 | -18 | 8 | 13 | 15 | 19 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound Calls | 19 | 17 | 12 | 3 | 11 | 15 | 17 | 19 |

Surplus/Deficiency for Each Time Interval

18 Agents Scheduled for Morning Shift
20 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound SMS | 15 | -3 | 5 | 11 | 13 | 12 | 15 | 15 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound SMS | 13 | -19 | 0 | 6 | 10 | 10 | 11 | 13 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound SMS | 31 | -34 | 1 | 30 | 25 | 31 | 32 | 35 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound SMS | 30 | -39 | 2 | 31 | 30 | 32 | 32 | 36 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound SMS | 15 | 6 | 10 | 12 | 15 | 17 | 19 | 19 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound SMS | 16 | -7 | -2 | 9 | 16 | 18 | 19 | 19 |

Surplus/Deficiency for Each Time Interval

25 Agents Scheduled for Morning Shift
20 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound SMS | 22 | 4 | 12 | 18 | 20 | 19 | 22 | 22 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound SMS | 20 | -12 | 7 | 13 | 17 | 17 | 18 | 20 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound SMS | 38 | -27 | 8 | 37 | 36 | 38 | 39 | 42 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound SMS | 37 | -32 | 9 | 38 | 37 | 39 | 39 | 43 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound SMS | 15 | 6 | 10 | 12 | 15 | 17 | 19 | 19 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound SMS | 16 | -7 | -2 | 9 | 16 | 18 | 19 | 19 |

FIG. 19   1910   1915   1920

Forecasted Communications for Each Time Interval

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Outbound SMS | 4,000 | | | | | | | |
| Inbound Calls | 0 | 6 | 21 | 73 | 37 | 23 | 14 | 4 |
| Inbound SMS | 33 | 183 | 112 | 75 | 42 | 42 | 27 | 15 |
|  | 11:00 a.m. | 11:15 a.m. | 11:30 a.m. | 11:45 a.m. | 12:00 p.m. | 12:15 p.m. | 12:30 p.m. | 12:45 p.m. |
| Outbound SMS | 5,000 | | | | | | | |
| Inbound Calls | 3 | 10 | 32 | 93 | 44 | 27 | 12 | 9 |
| Inbound SMS | 35 | 278 | 134 | 89 | 47 | 45 | 41 | 26 |
|  | 1:00 p.m. | 1:15 p.m. | 1:30 p.m. | 1:45 p.m. | 2:00 p.m. | 2:15 p.m. | 2:30 p.m. | 2:45 p.m. |
| Outbound SMS | 6,000 | | | | | | | |
| Inbound Calls | 5 | 21 | 40 | 103 | 78 | 18 | 7 | 4 |
| Inbound SMS | 44 | 372 | 199 | 52 | 56 | 47 | 42 | 22 |
|  | 3:00 p.m. | 3:15 p.m. | 3:30 p.m. | 3:45 p.m. | 4:00 p.m. | 4:15 p.m. | 4:30 p.m. | 4:45 p.m. |
| Outbound SMS | 6,000 | | | | | | | |
| Inbound Calls | 8 | 13 | 67 | 74 | 83 | 17 | 9 | 5 |
| Inbound SMS | 52 | 408 | 188 | 47 | 50 | 40 | 39 | 10 |
|  | 5:00 p.m. | 5:15 p.m. | 5:30 p.m. | 5:45 p.m. | 6:00 p.m. | 6:15 p.m. | 6:30 p.m. | 6:45 p.m. |
| Outbound SMS | 6,000 | | | | | | | |
| Inbound Calls | 5 | 14 | 38 | 116 | 53 | 30 | 17 | 3 |
| Inbound SMS | 30 | 78 | 53 | 47 | 35 | 23 | 8 | 4 |
|  | 7:00 p.m. | 7:15 p.m. | 7:30 p.m. | 7:45 p.m. | 8:00 p.m. | 8:15 p.m. | 8:30 p.m. | 8:45 p.m. |
| Outbound SMS | 3,000 | | | | | | | |
| Inbound Calls | 3 | 7 | 21 | 45 | 30 | 17 | 10 | 5 |
| Inbound SMS | 25 | 149 | 123 | 60 | 28 | 12 | 11 | 9 |

FIG. 20

Surplus/Deficiency for Each Time Interval

25 Agents Scheduled for Morning Shift
20 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound SMS | 21 | 0 | 10 | 15 | 17 | 17 | 20 | 22 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound SMS | 20 | -12 | 7 | 13 | 17 | 17 | 18 | 20 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound SMS | 38 | -12 | 14 | 37 | 36 | 38 | 39 | 42 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound SMS | 37 | -18 | 16 | 38 | 37 | 39 | 39 | 43 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound SMS | 15 | 6 | 10 | 12 | 15 | 17 | 19 | 19 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound SMS | 16 | -7 | -2 | 9 | 16 | 18 | 19 | 19 |

Surplus/Deficiency for Each Time Interval

25 Agents Scheduled for Morning Shift
20 Agents Scheduled for Afternoon Shift

|  | 9:00 a.m. | 9:15 a.m. | 9:30 a.m. | 9:45 a.m. | 10:00 a.m. | 10:15 a.m. | 10:30 a.m. | 10:45 a.m. |
|---|---|---|---|---|---|---|---|---|
| Inbound Calls | 25 | 23 | 19 | 4 | 11 | 16 | 20 | 23 |
|  | 11:00 a.m. | 11:15 a.m. | 11:30 a.m. | 11:45 a.m. | 12:00 p.m. | 12:15 p.m. | 12:30 p.m. | 12:45 p.m. |
| Inbound Calls | 24 | 22 | 16 | -2 | 8 | 15 | 20 | 22 |
|  | 1:00 p.m. | 1:15 p.m. | 1:30 p.m. | 1:45 p.m. | 2:00 p.m. | 2:15 p.m. | 2:30 p.m. | 2:45 p.m. |
| Inbound Calls | 43 | 38 | 32 | 11 | 20 | 39 | 43 | 44 |
|  | 3:00 p.m. | 3:15 p.m. | 3:30 p.m. | 3:45 p.m. | 4:00 p.m. | 4:15 p.m. | 4:30 p.m. | 4:45 p.m. |
| Inbound Calls | 42 | 41 | 23 | 21 | 18 | 39 | 42 | 43 |
|  | 5:00 p.m. | 5:15 p.m. | 5:30 p.m. | 5:45 p.m. | 6:00 p.m. | 6:15 p.m. | 6:30 p.m. | 6:45 p.m. |
| Inbound Calls | 18 | 15 | 6 | -24 | 5 | 11 | 15 | 19 |
|  | 7:00 p.m. | 7:15 p.m. | 7:30 p.m. | 7:45 p.m. | 8:00 p.m. | 8:15 p.m. | 8:30 p.m. | 8:45 p.m. |
| Inbound Calls | 19 | 17 | 12 | 3 | 11 | 15 | 17 | 19 |

FIG. 22 — 2210

FORECASTING AND SCHEDULING CAMPAIGNS INVOLVING SENDING OUTBOUND COMMUNICATIONS THAT GENERATE INBOUND COMMUNICATIONS

CROSS REFERENCE TO RELATED APPLICATIONS

This application is a continuation of U.S. patent application Ser. No. 15/349,392, filed Nov. 11, 2016, which is a continuation of U.S. patent application Ser. No. 15/211,502, now U.S. Pat. No. 9,531,881 and filed on Jul. 15, 2016, which is a continuation of U.S. patent application Ser. No. 14/884,823, now U.S. Pat. No. 9,426,291 and filed on Oct. 16, 2015, in which the entire contents of each are incorporated by reference for all that they teach.

BACKGROUND

Scheduling agents at contact centers is a complex process that typically involves a large number of variables to consider in generating schedules such as, for example, volume of communications to be handled (e.g., number of inbound communications typically received over a time period and/or number of outbound communications to be made over the time period), available staff, skills of various staff members (e.g., agents), reasons for communications (e.g., customer service, order taking, and/or sales), and number of communication sources (e.g., inbound queues and outbound queues). Further, in generating such schedules, forecasting techniques are typically employed to better predict scheduling variables based on historical data for such variables.

With that said, in today's world contact centers are beginning to use a wide range of channels of communication besides telephone calls to interact with individuals such as SMS text messages, Web chats, email, direct mail, IM messaging, etc. A channel of communication is understood to be a particular medium used for communicating. For instance, a contact center may use telephone calls as a first channel of communication, SMS text messages as a second channel of communication, and Web chats as a third channel of communication for communicating with remote parties. Furthermore, contact centers are beginning to utilize different channels of communication to conduct campaigns that do not fall into the types of campaigns that have been traditionally conducted by contact centers.

For example, traditionally, a contact center would place an outbound communication using a channel of communication with the intent of reaching the intended party with the outbound communication and conversing with the party over the outbound communication. For instance, a contact center would traditionally place an outbound telephone call to an intended party with the intent of having the intended party answer the outbound call and then conversing with the intended party over the outbound call.

However, because of the new channels of communication that are now available to a contact center, a contact center can place an outbound communication to an intended party with the intent of receiving an inbound communication from the intended party during a time that may be more convenient for the intended party. For example, a contact center can send an SMS text message to an intended party about a new product offering and the message may inform the party to place a call to the contact center at a time that is convenient if the party has any questions about the new product offering and/or to purchase the new product offering.

As a result, the scheduling process has become more and more complex with contact centers conducting campaigns that involve the use of different channels of communication to produce non-traditional outcomes. Although a good amount of effort has been put into creating products and processes for generating schedules for contact centers for traditional campaigns, deficiencies still exist with respect to products and processes for generating schedules for contact centers conducting non-traditional campaigns. Thus, a need in the art exists for improved processes for generating forecasts and schedules to conduct such campaigns and more specifically, a need in the art exists for improved processes for generating forecasts and schedules to conduct campaigns involving sending outbound communications to generate inbound communications. It is with respect to these considerations and others that the disclosure herein is presented.

BRIEF SUMMARY

In general, embodiments of the present invention provide computer program products, methods, systems, apparatus, and computing entities for generating a roster template for use in scheduling agent resources for a contact center to conduct a campaign. More specifically, a set of campaign parameters are defined for the campaign that includes: (1) a first channel of communication to be used to send outbound communications; (2) a second channel of communication to be used to receive inbound communications generated as a result of sending the outbound communications; and (3) a time period during which the campaign is to be conducted. In addition, a historical dataset is selected for the campaign that includes historical outbound communications sent using the first channel of communication that generated historical inbound communications received using the second channel of communication during a historical time period.

At this point, a forecast is generated in various embodiments based on the set of campaign parameters and the historical dataset establishing a first success rate for generating an inbound communication using the second channel of communication as a result of sending an outbound communication using the first channel of communication and a first average response time to receive the inbound communication. Accordingly, the forecast identifies a first number of inbound communications to receive using the second channel of communication during the time period the campaign is to be conducted and from there, a first number of agent resources needed to handle the first number of inbound communications is identified. Finally, a roster template is generated in various embodiments that includes one or more shifts identifying agent resources to schedule based on the first number of agent resources needed to handle the first number of inbound communications forecasted to be received during the time period the campaign is to be conducted.

In particular embodiments, a schedule is generated based on the roster template that identifies actual agent resources scheduled to work during the time period the campaign is to be conducted. Accordingly, when the campaign is conducted, the actual agent resources may be identified from the schedule and the agent resources currently logged in to handle inbound communications for the campaign may be verified based on the actual agent resources identified from the schedule. Such verification helps to identify any discrepancies between the agent resources currently logged in to handle inbound communications for the campaign and the actual agent resources identified from the schedule.

Further, in particular embodiments, a message may be received from a contact device about an inbound communication received by the contact center for the campaign and a particular agent is selected from the agent resources currently logged in to handle the inbound communication for the campaign. Accordingly, a determination is made as to whether the particular agent can handle the inbound communication based on capabilities of the particular agent with respect to handling inbound communications received using the second channel of communication. If the particular agent can handle such an inbound communication, then a message is sent to the contact device advising the contact device to transfer the inbound communication to the particular agent.

Finally, in particular embodiments, the set of campaign parameters may further include a third channel of communication to also be used to receive the inbound communications generated as a result of sending the outbound communications. In these particular embodiments, the historical dataset includes additional historical outbound communications sent using the first channel of communication that generated additional historical inbound communications received using the third channel of communication during the historical time period and the forecast is further based on the historical dataset establishing a second success rate for generating an inbound communication using the third channel of communication as a result of sending an outbound communication using the first channel of communication and a second average response time to receive the inbound communication using the third channel of communication. In this instance, the forecast further identifies a second number of inbound communications to receive using the third channel of communication during the time period the campaign is to be conducted.

Accordingly, a second number of agent resources needed to handle the second number of inbound communications to receive using the third channel of communication is identified and the roster template is evaluated to identify whether a deficiency exists in which the agent resources identified in the one or more shifts to schedule do not meet the second number of agent resources needed to handle the second number of communications to receive using the third channel of communication. If such a deficiency does exist, then a determination is made in particular embodiments as whether to address the deficiency based on the deficiency causing one or more requirements set forth by a first defined parameter not to be met. Upon determining the deficiency should be addressed, the one or more shifts identifying the agent resources to schedule are revised for the roster template so that the one or more requirements set forth by the at least one defined parameter are met and a second deficiency is not created in which the agent resources identified in the revised one or more shifts to schedule do not meet the first number of agent resources needed to handle the first number of inbound communications forecasted to be received during the time period the campaign is to be conducted causing one or more requirements set forth by a second defined parameter not to be met.

In various embodiments, the generation of the roster template is initially carried out with respect to the first number of agent resources needed to handle the first number of communications based on the second channel of communication having priority over the third channel of communication. In addition, in various embodiments, the actual agent resources identified in the schedule generated from the roster template are scheduled based on being able to handle inbound communications involving both the second channel of communication and the third channel of communication.

While in particular embodiments, the actual agent resources are scheduled based on being able to handle communications involving both the second channel of communication and the third channel of communication at virtually the same time.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIGS. 9-14 provide an example of forecasting and generating a roster template in accordance with various embodiments of the present invention.

FIGS. 15-22 provide another example of forecasting and generating a roster template in accordance with various embodiments of the present invention.

DETAILED DESCRIPTION

Figure 1:
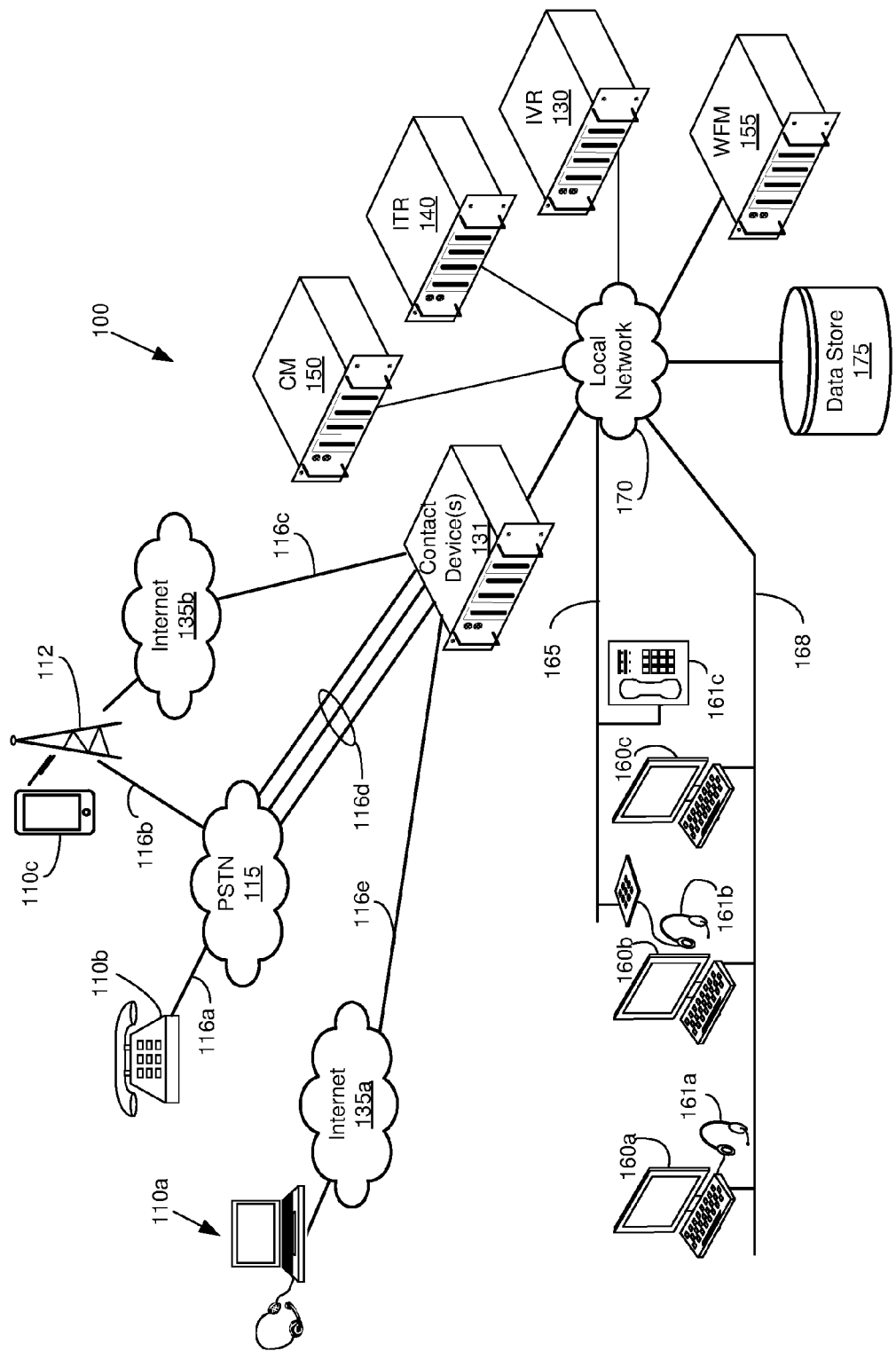
FIG. 1 shows one embodiment of a contact center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. The contact center architecture 100 shown in FIG. 1 may process various channels of communication such as voice calls, facsimiles, emails, text messages, video calls, Web chats, etc. that can be inbound-only, outbound-only, or a combination of both (sometimes referred to as a "blended" contact center). In particular instances, the contact center may be referred to as a call center. However, for purposes of this disclosure, the term "contact center" is used throughout, although it is understood that the two are synonymous.

With that said the contact center may handle communications originating from a remote party or initiated to a remote party. Thus, the term "party," without any further qualification, refers to an individual associated with a communication processed by the contact center, where the communication is either received from or placed to the party.

Depending on the embodiment, communications may originate to or be received from parties that use a variety of different devices. For instance, a party may receive or place a voice call using a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

In addition, a party may receive or place a communication using a device such as a desktop or laptop computer 110a, a smart phone 110c, mobile phone, tablet, or other mobile device. Depending on the device, these communications may be placed or received via an Internet provider 135a, 135b and/or wirelessly via a mobile service provider ("MSP") 112. For instance, communications may be routed to the PSTN 115 using an integrated services digital network ("ISDN") interface 116b or other type of interface that is well known to those skilled in the art. While in other instances, the MSP 112 may route communications as packetized data to/from an Internet provider 135b using Internet-based protocols. For convenience, unless indicated otherwise, the term "trunk" refers to any type of facility 116c, 116d, or 116e providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 131 for initiating and receiving communications based on the channel of communication. For instance, in various embodiments, communications such as inbound calls and/or inbound SMS text messages are received from parties by a contact device 131 such as an automatic call distributor ("ACD"). In particular embodiments, the ACD may be a specialized switch for receiving and routing inbound calls and/or text messages under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call and/or text message over contact center facilities 165, 168 to an available agent. Depending on the embodiment, the facilities 165, 168 may be any suitable technology for conveying the call and/or message, including but not limited to a local area network ("LAN"), wide area network ("WAN"), ISDN, and/or conventional TDM circuits. The exact details typically depend in part on the technology used. For example, in one embodiment, first facilities 165 may be analog or proprietary voice communication technology whereas second facilities 168 may be SIP oriented. As may be appreciated, there are various technologies and configurations that are possible. In addition, the facilities 165, 168 may be the same or different from the facilities used to transport the call and/or message to the ACD.

Depending on the embodiment, the ACD may place a call and/or text message in a queue if there is no suitable agent available. Further, the ACD may route a call to an interactive voice response system ("IVR") 130 to play voice prompts and/or may route a text message to an interactive text response system ("ITR") 140 to send message prompts. Depending on the embodiment, these prompts may solicit information from the party and the IVR 130 and/or ITR 140 may collect and analyze responses from the party in the form of dual-tone multiple frequency ("DMTF") tones, speech, and/or text. In addition, the IVR 130 and/or ITR 140 may be used to further identify the purpose of the call or text message, such as, for example, prompting the party to provide account information or otherwise obtain information used to service the call or text message. Further, in particular embodiments, the IVR 130 and/or ITR 140 may interact with other components, such as a data store 175, to retrieve or provide information for processing the call or text message.

Continuing on, in various embodiments, communications such as outbound calls and/or outbound SMS text messages may be sent using another contact device 131 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls and/or text messages to multiple telephone numbers simultaneously with the expectation that agents will be available to handle one or more of the calls that are answered and/or text messages that are responded to. In various embodiments, the predictive dialer makes use of one or more algorithms to determine how and when to dial/text numbers so as to minimize the likelihood of a party being placed in a queue while maintaining target agent utilization.

Once a call is answered or a text message is responded to by a party, the dialer may connect the call or direct the text message to an available agent using one or more facilities 165, 168. Other types of dialing methods may be used such as preview dialing in which information about an account is displayed to an agent to review prior to the dialer originating a call or text message to the account. In this way, when the party answers the call or responds to the text message, the agent can interact with the party in an effective way. The dialer may also originate a call or text message and connect the call to the IVR 130 or direct the text message to the ITR 140 for processing upon the party answering the call or responding to the text message. Further, in particular embodiments, the dialer may be configured so that it attempts to establish communication with parties using a calling/texting list of telephone numbers that is stored in a data store 175.

Depending on the embodiment, other contact devices 131 may be used for originating and/or receiving other channels of communication such as Web chats, emails, SMS text messages, etc. For example, the contact center may make use of a web server to host Web pages and interact with parties via Web chats. In addition, the contact center may make use of an email server to receive and send emails from parties. While in other embodiments, the contact center may convey and/or receive SMS text messages to/from a gateway instead of an ACD or dialer, which then conveys the messages to the Internet 135b and on to a mobile service provider 112. In these particular embodiments, such a gateway may provide a way for the contact center to send and/or receive SMS text messages that are not in a native SMS protocol and can be accepted or conveyed by the mobile service provider 112.

Again, information associated with these other channels of communication may be stored in the data store 175. In addition, like calls, a transfer-like operation may be used in various embodiments to connect a communication that has been answered and/or received with an available agent, or if an agent is not available, a queueing operation may be used to place the communication in a queue until an agent is available.

Accordingly, in various embodiments, the contact center may make use of a campaign monitoring system ("CM") 150 to monitor active campaigns and to direct the contact devices 131 on which agents should receive communications that have been made and/or received. Depending on the embodiment, the CM 150 may keep track of the agents who are available to handle communications as well as what channels of communications these agents are able to handle. For instance, a SMS text message may be received by the contact center and the CM 150 may determine which agents are available who can handle the SMS text message and direct the corresponding contact device 131 to direct the SMS text message to a particular agent who is available and able to handle the message.

With that said, an agent at the contact center typically uses a computing device 160a-160c, such as a personal computer, and a voice device 161a-161c to handle communications. The combination of computing device 160a-160c and voice device 161a-161c may be referred to as a "workstation." However, in particular embodiments, the computing device 160a-160c may also handle voice (e.g., VoIP) or voice capabilities may not be needed so that reference to an agent's "workstation" may only refer to a computing device 160a-160c without the use of a separate voice device 161a-161c.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level. In particular instances, if a suitable agent is not available to handle a particular communication, the contact center (e.g., the contact device 131) may queue the communication for the next available suitable agent.

Depending on the embodiment, interaction between a contact device 131, as well as other components within the contact center architecture 100, and agent's workstation may involve using a local area network ("LAN") 170. In addition, in particular embodiments, an agent may interact with components that provide information to the agent's workstation. For example, when a communication is directed to an agent, information above the party on the communication may be presented to the agent's computer device 160a-160b over the LAN 170 using facility 168.

Finally, another component that is employed in the contact center architecture 100 shown in FIG. 1 is a workforce management system ("WFM") 155. As is discussed in further detail below, in various embodiments, the WFM 155 maintains information and generates agents' schedules to effectively handle inbound/outbound communications. For instance, in particular embodiments, the WFM 155 maintains historical communication volume information for various types of communication campaigns and generates forecasts for expected communication volume based on the historical information to predict the number of agents needed to handle the communication volume at a defined service level. The WFM 155 then applies the forecasts and information about available agents to generate work rosters of agents (e.g., schedules). That is to say, the WFM 155 schedules agents for work shifts according to the anticipated needs of the communication campaigns.

Although a number of the above entities may be referred to as a "component," each may also be referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

General Overview of Process

Figure 2:
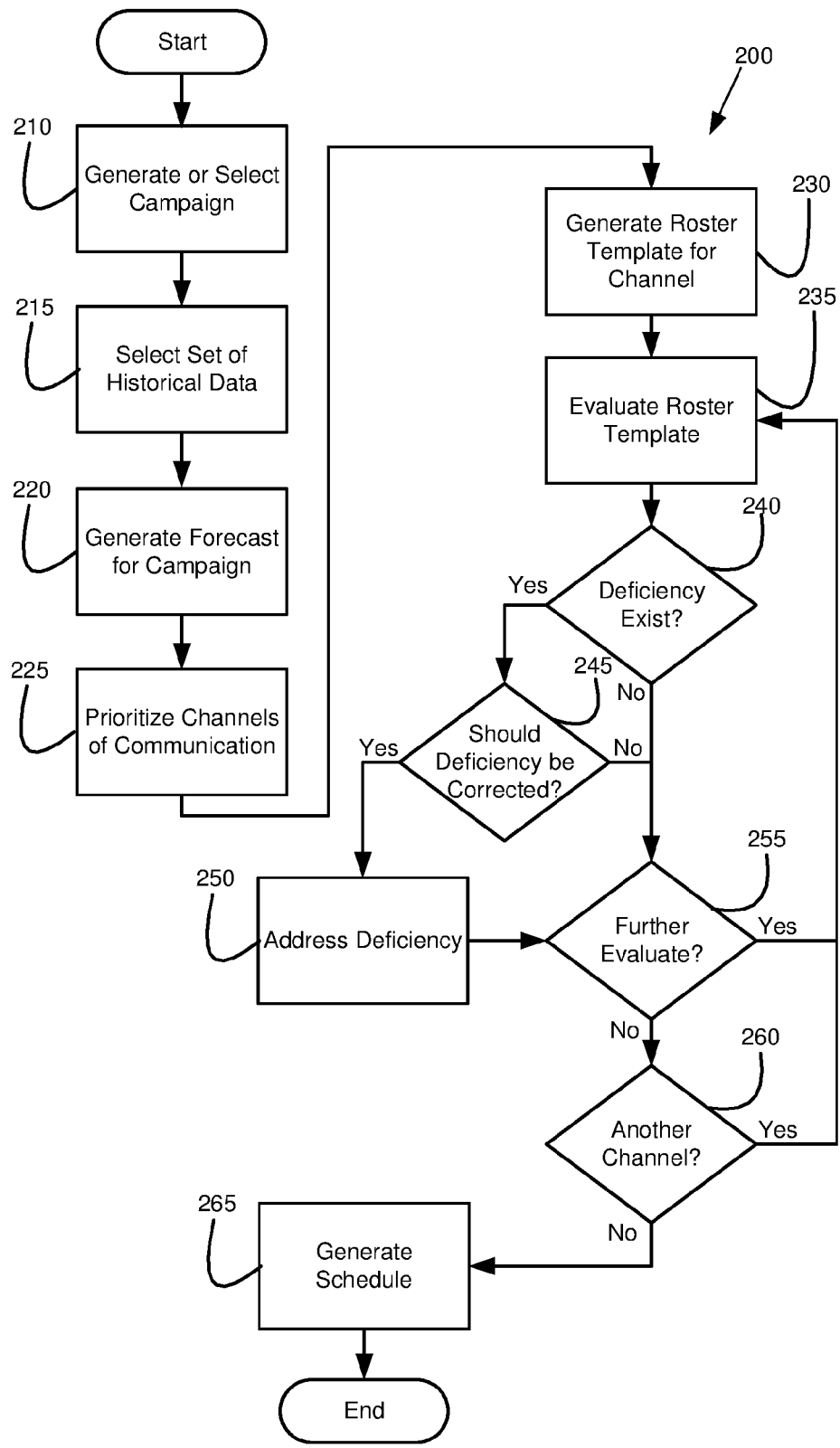
FIG. 2 is a flowchart illustrating a process for generating a schedule for a campaign involving sending outbound communications to generate inbound communications according to various embodiments of the present invention.

FIG. 2 provides an overview of a process 200 for generating a schedule for staff who are to conduct a campaign that involves sending outbound communications to generate inbound communications according to various embodiments of the invention. The process 200 may involve execution of various program modules, which may be repeated to refine the schedule generated. At a high level, the schedule generation process 200 involves generating/defining or selecting a communication campaign, along with historical data, which are then used to generate a forecast. The forecast, in turn, is used to generate a roster template for the campaign. Accordingly, the roster template is then used to generate a schedule that identifies the particular staff to fulfill the shifts in the roster template.

The process 200 typically begins with generating or selecting a campaign involving sending outbound communications for the purpose of generating inbound communications to the contact center, shown as Step 210. For instance, the campaign may involve sending SMS text messages for the purpose of generating inbound telephone calls and/or SMS text messages to the contact center.

Traditionally, campaigns are defined as either outbound or inbound. Generally speaking, an "outbound campaign" is understood to be a series of related communications to be placed to various parties in accordance with various parameters that typically include commonly defined goals (e.g., objectives). For example, a business may conduct an outbound campaign to place telephone calls to local residents to inform them of a new store location opening in the residents' area. In this example, the contact center attempts to reach the local residents on the calls to converse with them while on the calls to inform the residents of the new store location by, for example, playing them a recording or having them speak with an agent.

Typically an outbound campaign is defined by parameters such as, for example, the time period over which the campaign will be conducted (e.g., a start date and an end date), a "contact" list providing the parties to be contacted and the appropriate information to contact them (e.g., telephone numbers and/or email addresses), and/or the skills needed by those handling the communications (e.g., skills needed by the agents calling the parties on the list). In addition, other parameters may identify one or more goals or objectives to be achieved by the campaign. For example, a goal may specify a total number of communications that need to be made during the campaign or during a particular time interval of the campaign, a number of the communications that need to be answered, a number of the communications answered that need to reach the right party (right party connects/contacts or RPC), or a number of the RPC that need to result in a targeted activity being completed, such as, for example, completing a sale to the party (completes).

On the other hand, an "inbound campaign" is traditionally understood to be a series of related communications received from various parties over a time period that are typically initiated by the various parties independent of direct intervention by the contact center. For example, a business may have a technical support service that handles in-coming communications (e.g., calls, SMS text messages, and/or Web chats) received from various parties who have placed the communications to request technical support on a product sold by the business. Typically an inbound campaign is defined by parameters such as, for example, the time period over which the campaign will be conducted and/or skills needed by those handling the communications. In addition, in particular instances, an inbound communication may also be defined by one or more goals or objectives to be achieved by the campaign. For example, an objective may be to have each communication forwarded to an agent within a defined time limit once the communication has been placed in a queue to wait for an available agent.

However with that said, in this instance, the process 200 involves a campaign that may be viewed as somewhat of a hybrid of an outbound campaign and an inbound campaign. This is because the process 200 involves a campaign configured to send outbound communications to various parties with the goal (e.g., purpose) of generating inbound communications received by the contact center from these various parties. For example, as discussed above, the campaign may involve sending SMS text messages to various parties for the purpose of generating inbound telephone calls and/or SMS text messages received at the contact center from these parties. This type of hybrid campaign may be defined using parameters that are commonly found for both outbound and inbound campaigns. However, the campaign is neither an outbound campaign nor an inbound campaign as traditionally conducted by contact centers and accordingly, forecasting and scheduling techniques used for traditional outbound and inbound campaigns are not appropriate to use for this campaign.

For the sake of an example, a contact center has been contracted to conduct a campaign over the first week of June that involves sending out a thousand SMS text messages to various parties advertising a manufacturer's products and informing these parties to either call into the contact center or send a reply SMS text message to the contact center if they would like additional information on any of the products. Thus, for each SMS text message sent out by the contact center to an intended party, the contact center may potentially receive an inbound call or reply SMS text message from the party.

It should be noted that in this instance, generally speaking, agents at the contact center are able to handle multiple channels of communication at virtually the same time. That is to say, in many instances, an agent at the contact center can handle an inbound call while also handling an SMS text message. Other combinations are possible such as, for example, an agent may be able to handle two SMS text messages at the same time. With that said, an agent may not necessarily be handling two or more communications simultaneously but may be handling two or more communications in close proximity of one another. For example, an agent may be handling two SMS text messages at virtually the same time but the agent is not necessarily typing responses to both of the messages at exactly the same time. Those of ordinary skill in the art can envision multiple combinations that may be possible in light of this disclosure. However, for purposes of this example, the agents at the contact center are generally able to handle an inbound call while also handling an SMS text message.

At this point, a forecast is generated for the campaign. In order to generate the forecast, a historical dataset is selected that typically includes historical data for one or more campaigns that have been conducted using similar combinations of outbound and inbound traffic, shown as Step 215. Thus, in the example, the selected historical dataset includes data from one or more past campaigns conducted that involved sending outbound SMS text messages in which the generated inbound channels of communications included both telephone calls and SMS text messages.

Once the historical dataset have been selected, the schedule generation process 200 continues with generating a forecast for the campaign in Step 220. In general, the purpose of generating the forecast is to provide an accurate prediction of the resources needed to successfully handle each of the channels of communication that is to be received during the campaign as a result of sending out the one thousand SMS text messages. Thus, the forecast involves analyzing the historical dataset to predict the number of communications that will be received during the campaign and thus allowing computation of the number of resources needed to handle the communications.

With that said, in this instance the forecasting may involve additional parameters that are not found in forecasting conducted for traditional inbound and outbound campaigns. Firstly, the forecasting may involve considering the average response time to the outbound communications sent to the various parties. Accordingly, the average response time may vary depending on the channel of communication used by a party and when the outbound communications are sent. For instance, in the example, the average response time for parties placing inbound calls may differ from the average response time for parties replying via SMS text messages. Further, the average response time for parties placing inbound calls may differ depending on what time of day they receive the outbound communications. Secondly, the forecasting may involve considering the number or percentage of parties that respond to the outbound communications sent. Again, this parameter may differ depending on the channel of communication used to respond to the outbound communications and when the outbound communications are sent. Finally, the forecasting may involve, in instances in which parties may respond using more than one channel of communication, considering parties' preferences for using one channel of communication over another. Thus, in the example, the forecasting may consider how parties prefer to respond to the outbound SMS text messages when given the option to respond by telephone call or reply SMS text message.

Depending on the embodiment, the predictions and/or computations generated by the forecast may be provided for any number of time intervals selected for the campaign. For instance, in the example, the campaign is to be conducted over the first week of June. The contact center operates daily from 9:00 a.m. till 9:00 p.m. Thus, the time intervals selected for the campaign is typically some multiple of time that fits within this timeframe such as, for example, one hour, thirty minutes, or fifteen minutes. Therefore, the forecast provides a predicted number of inbound communications for each channel of communication during each time interval over the time period the campaign is to be conducted. Further, the forecast provides a number of outbound communications that are to be sent during each interval. Depending on the how the parameters are defined for the campaign, the outbound communications may be sent as a batch all at one time or as multiple batches at different times (over multiple time intervals) over the course of the campaign. Thus, one or more parameters defined for the campaign may drive when the outbound communications are sent during the campaign. For example, the contact center may only have a maximum number of agents that can be scheduled to work during any particular shift and therefore can only field a maximum number of inbound communications during any one time interval. Therefore, as a result, the forecasting may spread sending the outbound communications over different times during the campaign to accommodate this parameter.

Generally, the same time intervals are used for each channel of communication. However, in some embodiments, the time intervals may differ between the channels. For example, a campaign may be conducted to send emails to parties for the purpose of generating inbound calls and emails. In this instance, the frequency of inbound calls received may be at a much greater rate and over a shorter period of time than the frequency and period of time for inbound emails. Therefore, a shorter time interval (e.g., fifteen minutes) may be more appropriate for forecasting the inbound calls than for the inbound emails (e.g., sixty minutes).

Continuing on, in particular embodiments, information on the forecasted communications is used to compute what resources are required to meet the needs for the campaign. The needs for a particular campaign are typically dependent on the parameters, goals, and/or objectives defined for the campaign. For instance, a campaign may be defined to be conducted over a two-week period of time in which outbound communications are to be sent to generate seven hundred inbound communications over the course of the campaign. Thus, in this example, the needs of the outbound campaign identify the number of outbound communications required to be placed over the two-week period of time to reach seven hundred inbound communications. Accordingly, depending on the embodiment, the forecast provides one or more of a prediction on the number of outbound communications required to be placed over the two-week period of time for the campaign, as well as when these outbound communications should be sent, and the number of resources in the form of agents required to handle the inbound communications generated as result of sending the outbound communications. In particular instances, the forecast may also provide information on other resources that are required to meet the needs of the campaign such as, in the example, the number of trunks required to place the outbound communications.

Therefore, returning to the example, the forecast for the campaign provides a prediction on the number of inbound calls and SMS text messages that will be received for each time interval as well as the number of SMS text messages to send during each time interval and the number of agents required to handle the inbound calls and SMS text messages. In this instance, the number of agents required to handle the calls and SMS text messages may be dependent on one or more of the parameters defined and/or forecasted for the campaign. For instance, a parameter that is typically defined or forecasted provides the average time needed to handle one of the inbound communications (average handle time or "AHT"). (The AHT may be different for inbound calls and inbound SMS text messages.) Accordingly, the AHT affects the number of communications an agent can typically handle within a time interval. For example, if the AHT for an inbound call is five minutes and the time intervals are defined in fifteen minutes increments, then an agent who is available to handle calls for an entire time interval can handle three different inbound calls received during the time interval. Accordingly, if the AHT for an inbound SMS text message is three minutes and again the time intervals are defined in fifteen minutes increments, then an agent who is available to handle SMS text messages for an entire time interval can handle five different inbound SMS text messages received during the time interval. Therefore, if the forecast predicts seventy-five inbound calls and one-hundred inbound SMS text messages will be received during a particular time interval, then twenty-five agents will be required to handle all of the calls and twenty agents will be required to handle all of the SMS text messages received during this time interval.

At this point, if the forecast is unsatisfactory, it may be re-executed using a different/revised set of historical data and/or different/revised campaign. For instance, returning to the example, the parameters for the campaign may be changed to define the time intervals as thirty minutes instead of fifteen minutes. The forecast may then be regenerated based on the revised parameters for the campaign. Thus, a number of forecasts may be generated using revised parameters, goals, and/or objectives until a satisfactory prediction is obtained.

Once an acceptable forecast has been generated, the different channels of inbound communication are prioritized in Step 225. In various embodiments, the channels of communication are generally prioritized with respect to the importance of meeting the needs of these different channels. The indication of the relative priority can be done explicitly, e.g., by assigning a relative priority level to each channel, or implicitly, e.g., by the order in which channels are selected by a user when developing the campaign. For instance, the contact center in the example may consider it a top priority to adequately handle inbound calls so that all such calls are handled in a quick and efficient manner. Handling these calls in a quick and efficient manner may be seen as having enough staff (agents) available to answer all of these calls within a defined time frame upon receiving the calls (e.g., within five minutes of receiving the calls). Therefore, the contact center may consider the inbound calls to have a higher priority with respect to making sure that the required resources (e.g., agents) identified in the forecast are available as compared to handling the inbound SMS text messages. For example, the contact center may be able to defer sending a response back to the parties who have sent SMS text messages requesting product information so that an immediate response to these messages is not necessarily critical.

Once the channels of communication have been prioritized, a roster template is generated for the highest prioritized channel against the forecast for the campaign, shown as Step 230. For purposes of this disclosure, a "roster template" is understood to be one or more shifts (set of shifts) that are arranged to meet the needs of the generated forecast. Accordingly, a "shift" is a unit used in planning, allocating, and/or assigning work to staff. In various contexts, a shift may be further characterized by one or more different attributes, such as, for example: a certain type (e.g., outbound call shift, first campaign shift, or second campaign shift); a time period (e.g., the 8:30 a.m. to 5:30 p.m. shift, evening shift, or graveyard shift); or particular staff members (e.g., John Doe's shift, inbound communication agents' shift, or daytime employees' shift). Therefore, as demonstrated in these examples, a shift may be associated with an individual (e.g., John Doe's shift) or with a plurality of individuals (e.g., staff members assigned to the evening shift). In addition, these shifts may be overlapping, serial relative to one another, or a combination of both. Thus, a number of shifts may be in parallel and/or overlapping to each other during a work day and then serial relative to each other over a number of work days. In addition, the roster template may also identify in various embodiments the skills required by staff members to staff the set of shifts and any breaks and/or activities required for staff within the set of shifts.

Returning to the example, the contact center operates with two different shifts in a workday. A first shift that runs from 9:00 a.m. to 5:00 p.m. and a second shift that runs from 1:00 p.m. to 9:00 p.m. Thus, this step involves generating a roster template for the inbound calls received for the campaign identifying the number of agents needed during each first and second shift for each day to handle the inbound calls. At this point, depending on the embodiment, the roster template may be edited to modify or define parameters for the shifts and/or to fine-tune the roster template. For example, the shifts may be edited to include a thirty minute break for lunch. In particular instances, the roster template may be regenerated to take into consideration any such edits to the roster template. That is, in the example, the particular roster template may be regenerated to take into consideration the added thirty minute breaks for lunch.

Once the roster template has been generated and is acceptable, the roster template is evaluated to determine whether the sets of shifts for the roster template can adequately staff the next prioritized channel of communication in Step 235. Thus, in the example, the roster template is evaluated with respect to the inbound SMS text messages to be received by the contact center to determine whether the set of shifts for the roster template can adequately staff the campaign to handle these inbound SMS text messages based on the forecast generated for the campaign.

As indicated earlier for this example, an agent at the contact center is able to handle a call while also handling a SMS text message. Therefore, staff members (e.g., agents) who are fulfilling staffing requirements for the inbound calls may also concurrently fulfill staffing requirements for the inbound SMS text messages. That is to say, an agent can be on an inbound call while also handling a SMS text message. Accordingly, if the roster template requires twenty-five agents to work during a first shift on a given day to handle inbound calls, then these twenty-five agents can also handle the SMS text messages received during this first shift on the given day. Therefore, if the staffing requirements identified in the forecast requires twenty agents to work during the time intervals that occur over the first shift on the given day to handle the predicted inbound SMS text messages, then the first shift for the roster template can adequately staff the campaign to handle the number of inbound SMS text messages predicted to be received during this first shift on the given day.

However, if instead the staffing requirements identified by the forecast requires thirty agents to work during the time intervals that occur over the first shift on the given day to handle the predicted inbound SMS text messages, then the first shift for the roster template does not adequately staff the campaign to handle the number of inbound SMS text messages predicted to be received during this first shift on the given day. This is because the first shift for the roster template currently only has twenty-five agents working on the given day to meet the needs for the inbound calls while the time intervals identified in the forecast that occur over the first shift requires thirty agents to work to meet the needs for the inbound SMS text messages. Therefore a deficiency exists with respect to resources required (agents needed) to meet the needs of the second channel of communication even though the needs of the first channel of communication are adequately staffed. Such a determination in made in Step 240 of the process 200.

At this point, a determination is then made as to whether the deficiency should be addressed in Step 245. For instance, in various embodiments, the contact center may set parameters that are used to evaluate whether the deficiency should be addressed or not. For example, the contact center may set a parameter (e.g., a rule) that any deficiency greater than fifteen percent with respect to staffing a particular shift for a lower prioritized channel of communication be addressed. Therefore, in the example, the contact center determines the deficiency with respect to the second channel of communication for the first shift should be addressed since the deficiency is greater than fifteen percent (e.g., the deficiency is 5/30 or 17%).

Generally speaking, the deficiency may simply be addressed by adding staff to the shift. For instance, the deficiency with respect to the second channel of communication for the first shift could be addressed by simply adding at least one additional staff member to the shift to lower the deficiency to thirteen percent. However, other factors may influence whether staff may be added to the shift and/or the number of staff that may be added. For instance, the contact center may have a maximum number of staff available to work during a shift, workday, and/or campaign. In addition, the contact center may have limits on the number of hours staff members are allowed to work in a given time period, and/or limits on the cost of staffing a shift, workday, or campaign. Therefore, the contact center may not be able to address the deficiency by simply adding staff to work during the shift.

With that said, another solution may be to move staff members from one shift to another to address the deficiency. For instance, in the example, the second shift on the given day in the roster template may require thirty agents to meet the needs of the first channel of communication while the time intervals in the forecast for the second channel of communication that occur over the same shift (second shift) on the given day may require the same number of agents (thirty) to meet the needs of the second channel of communication. Thus, in this instance, the second channel of communication is adequately staffed during the second shift when the first channel of communication is adequately staffed. In addition, the contact center may have set a parameter (e.g., defined a rule) that any deficiency greater than ten percent with respect to staffing a particular shift for a top prioritized channel of communication should be addressed. Therefore, as long as twenty-seven agents are scheduled to work during the second shift then both the first and second channels of communication will be adequately staffed while meeting the contact center's deficiency parameters. Thus, the contact center can address the deficiency in the first shift by moving a staff member from the second shift to the first shift resulting in a total of twenty-six agents working the first shift for the given day and thus lowering the deficiency for the first shift to below the fifteen percent deficiency parameter threshold. Once the deficiency has been address in Step 250, a determination is made as to whether to continue to evaluate the roster template in Step 255. That is to say, a determination is made as to whether to continue to evaluate the roster template for the first and/or second shifts for other days to determine whether the sets of shifts for the template can adequately staff the next prioritized channel of communication. If so, then the process returns to Step 235 and continues to evaluate the roster template to determine whether the sets of shifts for the roster template can adequately staff the second channel of communication.

Once the roster template has been evaluated and modified to adequately staff the next prioritized channel of communication (e.g., the second channel of communication), then a determination is made as to whether another channel of communication needs to be evaluated in Step 260. If so, then the process returns to Step 235 to evaluate the roster template to determine whether the set of shifts for this template can adequately staff the third channel of communication.

After the roster template has been evaluated and all deficiencies that needed to be addressed have been so, the roster template in the example includes a first shift requiring twenty-six agents and a second shift requiring twenty-nine agents on the given day. At this point, a schedule is generated based on the roster template and the staff of the contact center, shown as Step 265.

"Staff" refers to one or more human resources (typically employees of the contact center) that can be allocated work. In particular instances, the staff can be characterized as having one or more common attributes. For example, a particular contact center may have multiple locations and the staff may be considered the group of employees that work at a particular location, or both locations. Further, the staff may comprise employees of a particular type and/or skill set. For example, one contact center may consider its employees to make up a first staff of agents and a second staff of supervisors and managers. One of ordinary skill in the art can envision numerous attributes that may be used to define a staff in light of this disclosure.

In addition, staff members (employees) may have individual skills assigned to them. For instance, a staff member's skill set may identify whether the staff member is able to actually handle a call (inbound or outbound) and also a SMS text message concurrently. For example, a first staff member's skill set may indicate the first staff member is able to handle a call and a SMS text message concurrently, while a second staff member's skill set may indicate the second staff member is able to handle a call or a SMS text message only. Therefore, in this example, the first staff member may more likely be scheduled to work the first or second shift for a given day when the campaign is being conducted over the second staff member since the first staff member can handle two channels of communication (a call and a SMS text message) concurrently while the second staff member can only handle one channel of communication (a call or a SMS text message) at any given time.

Thus, the contact center staff is applied to the roster template to generate a schedule to conduct the campaign in the example. Accordingly, the schedule identifies specific members of the staff (e.g., agents) assigned to work in the set of shifts identified for the roster template. That is, the schedule identifies specific agents assigned to work the first shift and second shift for each day the campaign is to be conducted over the first week of June.

Finally, in particular embodiments, the campaign, forecast, and/or resulting roster template and schedule may be revised during execution of the campaign. Specifically, based on performance data after the campaign has started, adjustments to the schedule may be generated. For instance, returning to the example, after the first two days have been completed for the campaign, performance data may be used to revise the campaign, forecast, roster template, and/or schedule. For example, the performance data may show that for the first two days of the campaign, the twenty-six agents working the first shift have been unable to adequately handle the SMS text messages received by the contact center. Further, the performance data may show that for these same two days, the twenty-nine agents working the second shift have been able to adequately handle the calls and SMS text messages received by the contact center. Therefore, although the campaign's requirements are being adequately addressed for the second shift, they are not being adequately addressed for the first shift. As noted earlier, the deficiency parameters are met as long as the second shift has at least twenty-seven agents working the shift. Therefore, in this instance, the roster template may be revised to move an agent from the second shift to the first shift and the schedule may be revised accordingly.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Mange Schedule Module

Figure 3:
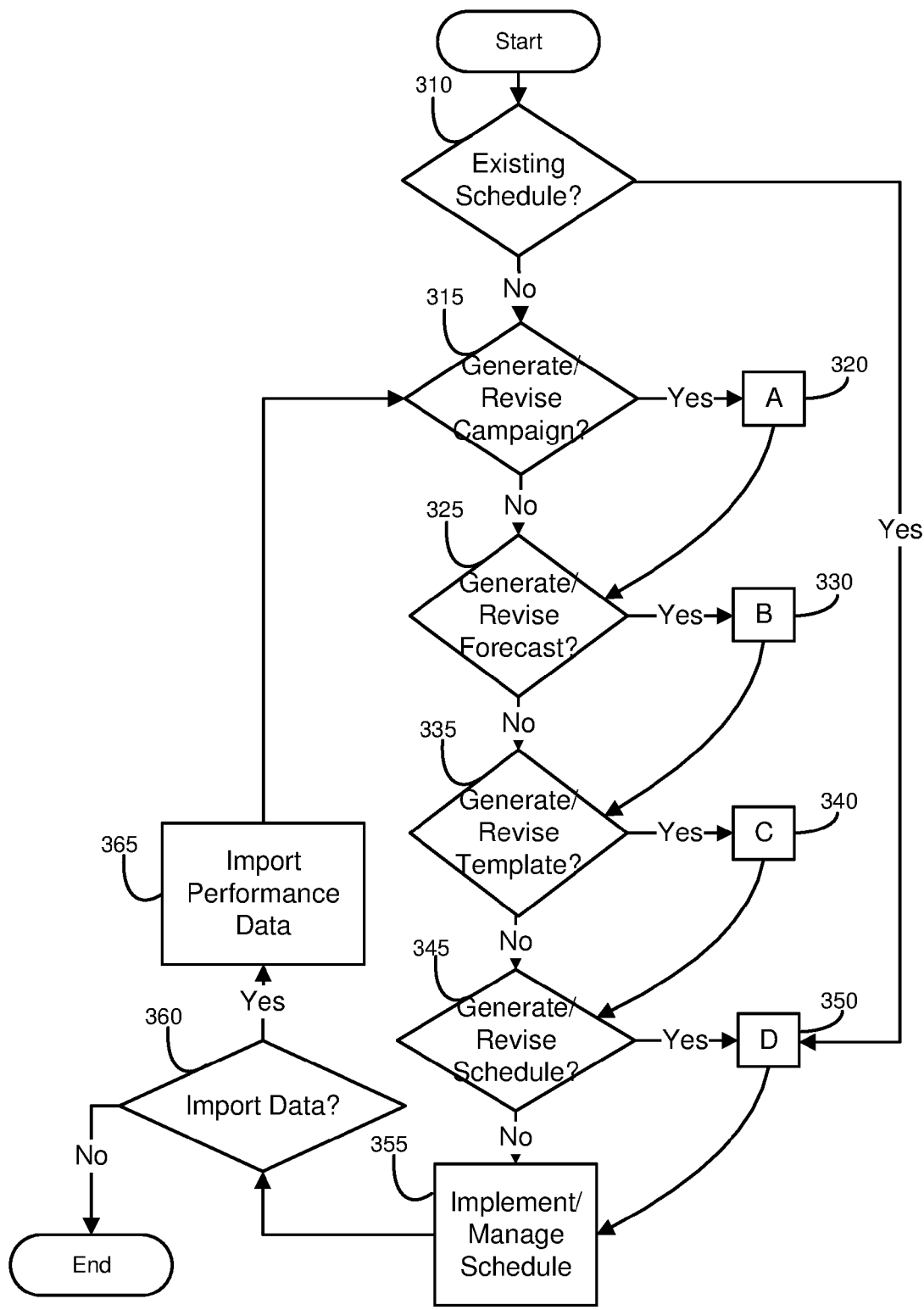
FIG. 3 is a flowchart illustrating a manage schedule module that can be used in accordance with various embodiments of the present invention.

Turning now to FIG. 3, additional details are provided regarding the process flow for managing a schedule for a campaign being conducted that sends outbound communications to generate inbound communications using one or more channels of communication. In particular, FIG. 3 is a flow diagram showing a manage schedule module for performing such functionality according to one embodiment of the invention. For example, the flow diagram shown in FIG. 3 may correspond to operations carried out by a processor in a system, such as the WFM 155, as it executes the manage schedule module stored in the system's volatile and/or nonvolatile memory. In various embodiments, to facilitate the generation and management of schedules, a contact center administrator may be provided with one or more interfaces in communication with the manage schedule module. These interfaces may comprise one or more screens from which the user (e.g., the contact center administrator) may generate and manage schedules.

In general, the manage schedule module invokes a number of other modules to provide functionality needed to be performed by the user in relation to generating, revising, implementing, and managing schedules. Such functionality includes generating, revising, implementing, and managing campaigns, forecasts, roster templates, and schedules. Further details with respect to the different modules are provided in the discussion below and FIGS. 4-8.

Turning now to FIG. 3, the manage schedule module provides an interface screen ("home screen") with a number of different options for the user to select from. For example, if the user would like to simply revise a schedule previously generated and saved, the user selects the "manage schedule" option and the manage schedule module determines such in Operation 310 and takes the user to one or more subsequent screens for selecting the schedule and making the appropriate revisions. However, for purposes of providing this disclosure, it is assumed the user is generating a schedule for a campaign involving sending outbound communications to generate inbound communications to the contact center.

Thus, the user initially selects the option to generate a new campaign and the manage schedule module determines this option has been selected in Operation 315. As a result, the manage schedule module invokes the campaign module for generating a new campaign, shown as Operation 320. As is explained in greater detail below, the user generates a new campaign via the campaign module and saves the campaign. The generation process for the new campaign involves defining a number of parameters for the new campaign.

Depending on the embodiment, the user may be returned to the home screen displaying the different options or may be taken directly to one or more screens for generating a forecast for the new campaign. That is, depending on the embodiment, the manage schedule module may determine the option to generate a forecast has been selected in Operation 325 by the user selecting the option on the home screen or by the campaign module setting the option. Accordingly, the manage schedule module invokes the forecast module in Operation 330. As explained in further detail below, the forecast module generates a forecast based on the parameters defined for the new campaign and historical data on similar communications conducted for one or more past campaign(s). Depending on the circumstances, the forecast provides predictions on the number of communications to be made and/or expected to be received over the time period the campaign is to be conducted. From this, information can be determined regarding the likelihood of meeting the objectives (e.g., goals) of the new campaign.

Once the forecast module has generated a satisfactory forecast for the campaign, the manage schedule module determines whether the option to generate a roster template has been selected, shown as Operation 335. Similar to the forecast option, depending on the embodiment, the roster template option may be selected by the user on the home screen or by the forecast module. Thus, the manage schedule module invokes the roster template module, shown as Operation 340. As previously described, a roster template defines a group of shifts needed to meet the forecast requirements for the campaign. In various embodiments, the user may define further characteristics (e.g., parameters) for the roster template. Once the user is satisfied with the roster template for the campaign, the roster template module saves the roster template.

At this point, the manage schedule module determines whether the option to generate a schedule has been selected, shown as Operation 345. Again, the option may be selected by the user from the home screen or by the roster template module depending on the embodiment. Upon determining the option to generate a schedule has been selected, the manage schedule module invokes the schedule module, shown as Operation 350. Once the schedule module has been invoked, the user generates a schedule for conducting the campaign by identifying staff to fill the set of shifts in the roster template. Similar to the roster template, the user may define further characteristics (e.g., parameters) for the schedule. Once the user is satisfied with the schedule, the schedule is saved.

Once the schedule has been generated and saved, the user may be presented with one or more screens to implement the schedule, shown as Operation 355. Depending on the embodiment, implementation of the schedule may involve different processing operations. For instance, in one embodiment, the schedule may simply be posted so that staff may view the schedule to determine when they are to work during the time the campaign is to be conducted. However, in other embodiments, the schedule (and/or information from the schedule) may be uploaded to one or more other business enterprise systems in the contact center to facilitate further functionality during the time the campaign is to be conducted. For example, in particular embodiments, supervisors may make use of monitoring systems to ensure agents are adhering to their schedules and working efficiently during the campaign. Information taken from the schedule (such as, for instance, which agents are scheduled to work during a particular shift) may facilitate such monitoring. In other embodiments, the schedule may be communicated to individual staff members scheduled to work.

As the campaign is carried out in the contact center, the user (e.g., the contact center administrator) may wish to manage the schedule based on changing circumstances surrounding the campaign. For instance, an agent who is scheduled to work over the next three days the campaign is to be conducted may suddenly become sick and unable to work. Thus, the user may invoke the manage schedule module and select the schedule from existing schedules. Accordingly, the manage schedule module determines the user has selected an existing schedule at Operation 310 and proceeds to Operation 350 so that the user may revise the schedule to replace the sick agent with another agent. Once the revision has been made, the user may then re-implement the schedule so that the change is reflected within the contact center systems.

In addition, the user may revise the schedule based on performance data collected for a portion of the campaign that has been carried out. That is, after the campaign has been conducted for a period of time, the user may revise the campaign, forecast, roster template, and/or schedule based on performance data collected for the campaign during this period of time. Thus, returning to FIG. 4, once the user is presented with the one or more screens to manage the schedule, the user may indicate (e.g., select an option on a screen) that he would like to import performance data for the campaign associated with the selected schedule. In response, the manage schedule module determines the user would like to import performance data, shown as Operation 360.

In one embodiment, the user may provide a source for the performance data before selecting the option to import the data. That is, for example, the performance data may be saved in a file or database and the user identifies the location of the file or database so that, upon selecting the option to import the performance data, the data is imported. However, in another embodiment, the user may first be taken to a different screen upon selecting the option to import the performance data. Once on the screen, the user may then identify the source of the performance data and select the option to "import." Those of ordinary skill in the art can envision numerous ways in which the user can import the performance data in light of this disclosure. At this point, the manage schedule module imports the performance data, shown as Operation 365.

After the performance data has been imported, the user may revise the campaign, forecast, roster template, and/or schedule. For example, in a typical situation, the user may rerun the forecast based on the performance data to determine whether the objectives for the campaign may still be met in light of the current schedule and performance thus far. If the results of the forecast are unsatisfactory, the user may then revise the campaign, roster template, and/or schedule accordingly to produce a revised schedule. Thus, in various embodiments, the managing schedule module allows monitoring the performance of the campaign and revising the schedule based on the monitored performance. Further details are now provided on the individual modules with regard to various embodiments of the invention.

Campaign Module

Figure 4:
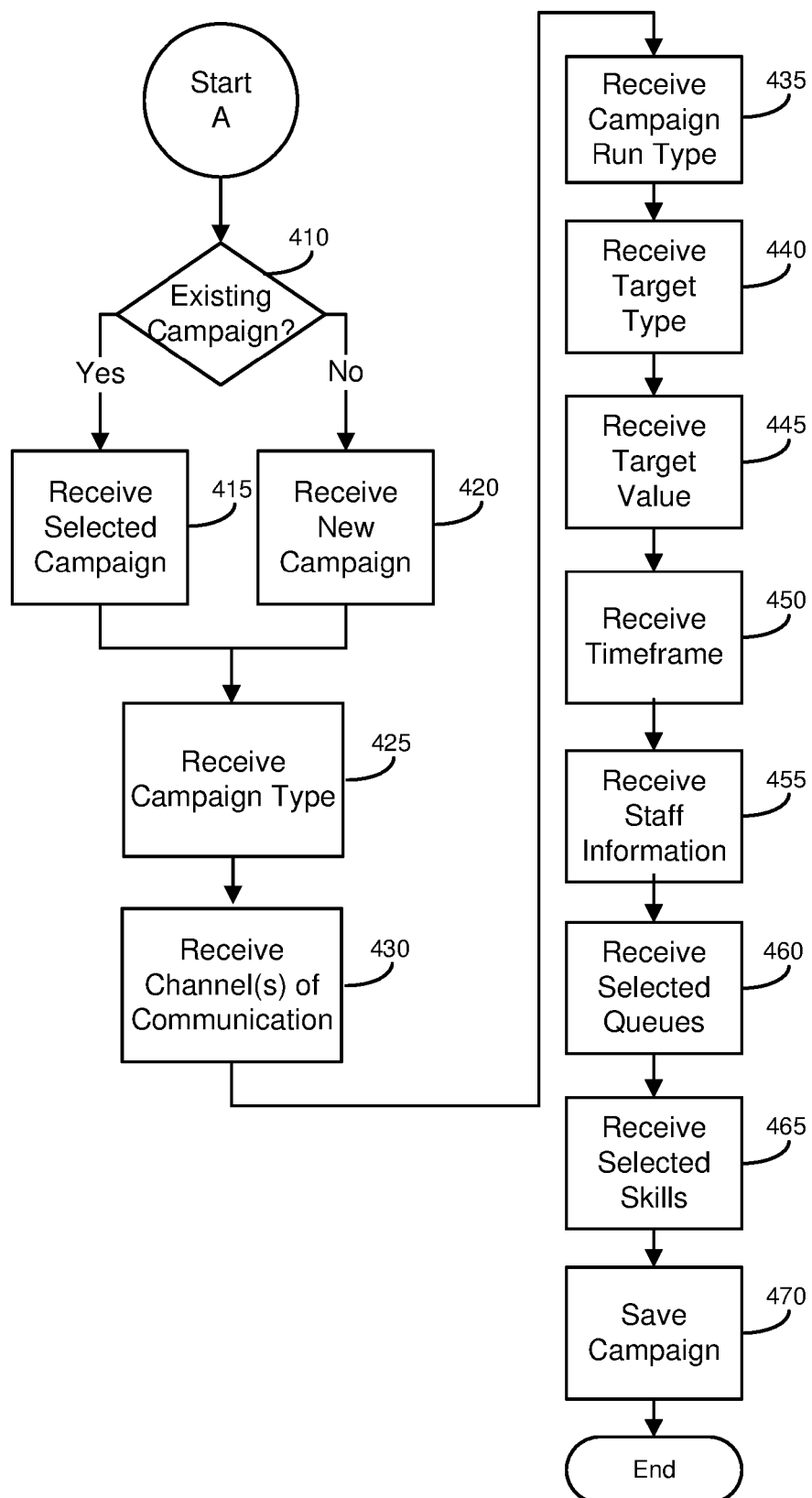
FIG. 4 is a flowchart illustrating a campaign module that can be used in accordance with various embodiments of the present invention.

Turning now to FIG. 4, additional details are provided regarding the process flow for generating and managing campaigns. In particular, FIG. 4 is a flow diagram showing a campaign module for performing such functionality according to one embodiment of the invention. As mentioned, in various embodiments, the campaign module is invoked by the manage schedule module described above whenever a user generates or manages one or more campaigns. However, it should be understood that in other embodiments, the campaign module may be a stand-alone computer program module and may be used for generating campaigns without necessarily requiring generation of a forecast, template, and/or schedule. Thus, like the manage schedule module, the flow diagram shown in FIG. 5 may correspond to operations carried out by a processor in a system, such as the WFM 155 for example, as it executes the campaign module stored in the system's volatile and/or nonvolatile memory.

In various embodiments, the campaign module enables a user to manage an individual campaign by setting or modifying parameters associated with the campaign. For instance, in particular embodiments, the campaign module enables a user to indicate a particular campaign type for the campaign (e.g., inbound, outbound, or hybrid), set the channel(s) of communication used for the campaign (e.g., call, Web chat, SMS text message, email, etc.), set campaign objectives (e.g., goals), set a time period over which the campaign will run, set skills required by agents working the campaign, set minimum and maximum staff available to work the campaign for a particular interval of time, set communication sources (e.g., queues) for the campaign, or any combination thereof. Once the user has generated and defined a campaign, the user is able to generate a forecast for the campaign.

Turning to FIG. 4, once the campaign module has been invoked, the user is provided an initial screen to select an existing campaign or define a new campaign. For example, in one embodiment, the user is provided with an initial screen that provides a listing of existing campaigns and the user may simply select the desired campaign from the listing. On the other hand, if the user wants to define a new campaign, the user is prompted to select the "New" button. A message appears on the screen requesting the user to enter a name for the new campaign and to click "Ok."

Looking at the flow diagram in FIG. 4, the campaign module determines in Operation 410 whether the user wants to work with an existing campaign or define a new campaign. That is, in particular embodiments, the campaign module receives an indication whether the user has selected an existing campaign or has selected the "New" button. If the campaign module determines the user has selected an existing campaign, the module receives the selected campaign in Operation 415. However, if the campaign module determines the user has selected the "New" button and has entered a name for the new campaign, the module receives the new campaign in Operation 420.

At this point, in various embodiments, the user is presented with one or more screens displaying information (e.g., parameters) defined for the campaign. If the user is defining a new campaign, the fields for the information are typically blank so that the user may enter such information, although some of the fields may display default information. For example, in particular embodiments, the fields may include a description field so that the user may enter a short description of the campaign. In addition, the fields may include a field to indicate (e.g., select) the campaign type. For instance, in one embodiment, the user is given the option to set the campaign type to "inbound," "outbound," or "hybrid." Accordingly, the user selects the appropriate campaign type based on whether he is building an inbound or outbound campaign or a hybrid campaign that involves sending outbound communications to generate inbound communications and the campaign module receives the select in Operation 425.

Therefore, if the user is constructing a hybrid campaign that involves sending outbound communications to generate inbound communications, the fields may include a field for selecting the one or more channels of communication to be used for the campaign to send outbound traffic. For example, the user may be given a drop down menu providing a listing of channels of communication that are available for the contact center. Such channels may include, for example, telephone calls, Web chats, SMS text messages, emails, instant messages, etc. Likewise, the fields may include a field for selecting the one or more channels of communication to be used for the campaign to receive inbound traffic. Thus, the user selects the desired channel(s) of communication and the campaign module receives the selection(s) in Operation 430.

Another field that may be included indicates (e.g., select) a campaign run type. For instance, in particular embodiments, the user may select the option to set the campaign run type to "entire" or "periodical." An entire campaign run type applies any objectives (e.g., goals) defined for the campaign across the entire time period the campaign is conducted. For example, the user may be generating a hybrid campaign and may define a goal for the campaign that is to be conducted over a week that requires five thousand SMS text messages to be sent across the week. Thus, in this example, at the end of the first day of the campaign, a total of seven hundred and twenty SMS text messages may have been sent. Therefore, at the start of the second day, four thousand two hundred and eighty messages still need to be sent during the remainder of the week for the campaign. On the other hand, a periodical campaign run type applies the objectives (e.g., goals) to time periods that occur during the campaign (e.g., to every day) and each time period may have its own objectives to achieve. That is say, different time periods (e.g., different days) may have different objectives. For example, another hybrid campaign may be structured so that on weekdays between 9:00 a.m. and 12:00 p.m., the objective is to send three hundred SMS text messages and on weekdays between 5:00 p.m. and 8:00 p.m., the objective is to send six hundred SMS text messages. Accordingly, if the user selects a campaign run type, the campaign module receives this selection in Operation 435.

Depending on the embodiment, other fields may be included identifying other objectives of the campaign. For instance, in one embodiment, the user may indicate one or more target types for the campaign. For example, the user may be provided with a field to select the target type to be applied to the campaign run type such as, for instance: (1) a total number of outbound communications that need to be made during the entire campaign or particular time period in the campaign; (2) a total number of inbound communications that need to be generated during the entire campaign or particular time period in the campaign; (3) a limit (e.g., a number or percentage) on a number of inbound communications that can be lost once received and sitting in a queue during the entire campaign or particular time period in the campaign; (4) a limit on the amount of time inbound communications are to remain in a queue before being serviced during the entire campaign or particular time period in the campaign; and (5) a number of inbound communications that need to result in a targeted activity being completed. Further, the user may be provided with a field to enter a target value for the selected target type. For instance, if the user has selected a target type for the number of outbound communications to be sent during the campaign, the user may enter a value for the number. Accordingly, the campaign module receives this information in Operations 440 and 445.

Further, in particular embodiments, the user may be provided with fields to enter a timeframe over which the campaign is to be conducted. If so, the campaign module receives this information in Operation 450. For example, in one embodiment, fields are provided for the user to indicate the start date (e.g., day and time) and end date (e.g., day and time) for the campaign such as, for instance, Apr. 19, 2015, to Apr. 25, 2015. However, depending on the embodiment, the timeframe indicated by the user may identify a particular week(s), where other information defines when a week starts and ends. The user may indicate a number of days starting from a given date. Likewise, in particular embodiments, the user may be provided with fields to enter a timeframe over which the outbound communications can be sent. In many instances, this timeframe is shorter than the timeframe over which the campaign will be conducted and the user may set such fields to ensure that all the generated inbound communications are received within the timeframe over which the campaign is to be conducted.

In addition, in particular embodiments, the user may be provided with fields to enter minimum and maximum staff required during a particular interval of time (e.g., day) for the campaign. If so, the campaign module receives the staff information in Operation 455. For example, the user may enter a value of twenty-five for the minimum staff required for each day of the campaign. As a result, the campaign will have at least twenty-five staff members working each day of the campaign. Similarly, the user may enter a value of forty for the maximum number of staff required for each day of the campaign. As a result, the campaign will have no more than forty staff members working each day of the campaign.

It is noted that in particular embodiments in which the channels of communication are prioritized, the effect of prioritizing the channels (e.g., ranking the channels) is that during times of projected high demand for staff, the maximum number of staff from the highest prioritized channel is allocated first. If there are still staff available (based on the contact center's capacity) then the next prioritized channel's maximum staffing number is used, and so on.

Continuing on, the campaign module may provide one or more screens in particular embodiments so that the user may identify the sources for communications and/or the skills required by the staff members who work the campaign. Various contact centers routinely place communications (calls, Web chats, SMS text messages, etc.) in one or more queues until staff members (e.g., agents) become available to handle the communications. Depending on the embodiment, the queues may be set up based on any number of parameters. For instance, a queue may be set up for a particular campaign or for a particular skill set required by the agents servicing the communications placed in the queue. For example, a campaign may be set up for sending outbound SMS text messages to potential customers informing them of an insurance company's new life insurance and long-term disability products and asking them to call into the contact center to obtain information on such products. In this instance, the campaign may require agents trained on the new life insurance product and the new long-term disability product to work during the campaign so that they can adequately handle the inbound calls received for the campaign. As a result, two queues may be set up for the campaign in which one of the queues processes inbound calls pertaining to the life insurance product and the other of the queues processes inbound calls pertaining to the long-term disability product. Such a configuration allows the calls to be directed to the properly trained agents working the campaign.

Thus in particular embodiments, the user may link one or more queues to a campaign. For instance, in one embodiment, the user right-clicks in a queue area provided on a screen and a list of available queues is provided. (In this particular embodiment, the queues available for the contact center have been previously defined prior to the user creating the campaign.) The user selects the desired queue and clicks a button to add the queue to the list of queues associated with the campaign. If the user wants to associate another queue with the campaign, the user selects another queue, and so forth. Therefore, one or more queues may be associated with the campaign and as a result, the campaign module receives the selected queues in Operation 460.

In particular embodiments, the user may link skills to the campaign. For instance, in one embodiment, the user right-clicks in the skills area provided on the screen and a list of available skills is provided. (Again, in these particular embodiments, the skills available for the staff of the contact center have been previously defined prior to the user creating the campaign.) The user selects the desired skill and clicks a button to add the skill to the list of skills associated with the campaign. It is noted that in various embodiments, the skill may be linked, not only to the campaign, but also to one or more particular queues if desired. Once the user has selected all of the desired skills, the campaign module receives the selected skills in Operation 465. As described in greater detail below, in particular embodiments, the skills associated with the campaign may also be linked to a forecast, roster template, and schedule generated for the campaign.

At this point, the user select a button to save the campaign. Accordingly, the campaign module saves the campaign in Operation 470. It is noted that in various embodiments, the campaign module may be provided with additional capabilities. For instance, in one particular embodiment, the campaign module may provide a user with the capability to copy an existing campaign. Such a capability allows the user to build a new campaign based on an existing campaign's information (e.g., parameters). Also, particular embodiments of the campaign module may provide the capabilities to delete campaigns and to mark and manage inactive campaigns. One of ordinary skill in the art can envision other capabilities in light of this disclosure.

Forecast Module

Figure 5:
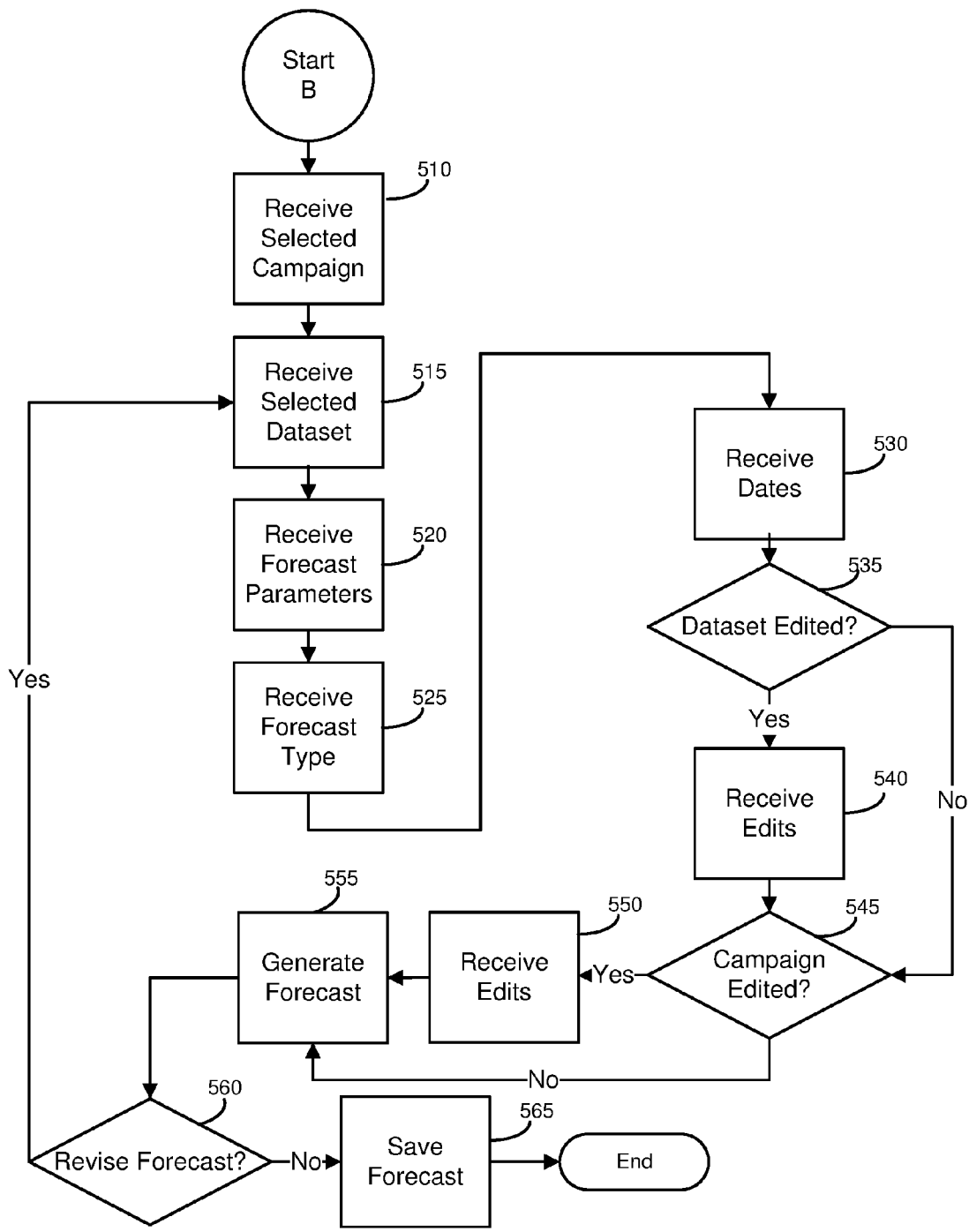
FIG. 5 is a flowchart illustrating a forecast module that can be used in accordance with various embodiments of the present invention.

Turning now to FIG. 5, additional details are provided regarding the process flow for generating and managing a forecast for a campaign. In particular, FIG. 5 is a flow diagram showing a forecast module for performing such functionality according to one embodiment of the invention. Similar to the campaign module, in various embodiments, the forecast module may also be invoked by the manage schedule module described above whenever a user is to generate or manage a forecast for a campaign. However, it should be understood that in other embodiments, the forecast module may be a stand-alone computer program module. Thus, the flow diagram shown in FIG. 5 may correspond to operations carried out by a processor in a system, such as the WFM 155 for example, as it executes the forecast module stored in the system's volatile and/or nonvolatile memory.

Similar to the campaign module, the forecast module is configured to enable a user to generate new forecasts and/or to modify existing forecasts according to various embodiments of the invention. For example, in one embodiment, the user may select a forecast to modify from an initial screen listing existing forecasts. Thus, the operations in FIG. 5 may be carried out for a new or existing forecast. However, for purposes of disclosure, it is assumed the user has indicated he would like to generate a new forecast.

The forecast module begins with receiving a selection of a campaign in Operation 510. That is, the user selects a campaign for which the user wants to include in the forecast. For example, in particular embodiments, the user is presented with a screen that includes a listing of available campaigns. The user reviews the listing and selects the desired campaign.

The next operation in generating an outbound forecast is for the user to select a historical dataset as the basis of the forecast. In one embodiment, the user is provided with a screen from which the user can select a dataset. For instance, this screen may allow the user to navigate to a location of existing datasets and to select a desired dataset from a listing of existing datasets. Depending on the embodiment, the datasets may be stored in various data structures such as, for example, files or databases. Further, depending on the embodiment, the datasets may comprise different types of data for previously conducted (e.g., historical) campaigns. For instance, the datasets may be grouped according to channels of communication, time periods, and the queues used to conduct the campaigns. However, in other instances, the datasets may be grouped according to other parameters such as based on customer or the subject matter for the campaigns. For example, in one embodiment, one or more datasets may be based on campaigns conducted for soliciting donations for charities while one or more other datasets may be based on campaigns conducted for generating sales inquiries for various products. Further, datasets may be combined into a "master" dataset to be used for forecasting purposes. One of ordinary skill in the art can envision numerous groupings of datasets in light of this disclosure. However, typically, a user selects a dataset (or combined datasets into a "master" dataset) with similar characteristics to the campaign for which the user is generating a forecast for. Thus, the forecast module receives the selected dataset in Operation 515.

Next, the user defines parameters for the forecast and the forecast module receives the parameters in Operation 520. For instance, in various embodiments, the parameters may include a start date for the forecast, a location to save the forecast, an indication of how much of the historical dataset to use for the forecast, and/or whether to include "special days" from the dataset. For example, the user may select a forecast start date of Apr. 20, 2015, and a location of Location1. Depending on the embodiment, Location1 may just indicate a particular location on the contact center's system to store the forecast such as, for example, the data store 175 shown in FIG. 1. However, in particular embodiments, Location1 may also indicate a particular location for the contact center. For example, the contact center may have office locations in Atlanta and Chicago and the location selected by the user may also identify which office location the forecast relates to. For these particular embodiments, this may help the user to keep forecasts better organized and may help the user to better search and identify desired forecasts.

The user may indicate that four weeks of data should be used from the dataset in generating the forecast and that any "special days" that fall within the four weeks should be included in the data used for generating the forecast. In particular embodiments, special days include days that are typically considered out of the "norm" for an operational day of a campaign. That is to say, special days usually have a communication pattern considered quite different than an ordinary day for the contact center. For instance, public holidays or days in which the contact center encountered an unusual situation such as a server crash may be marked as special days. Therefore, depending on the campaign for which the user is generating the forecast for, the user may wish to include or exclude the special days of data that may be included in the dataset since these days could potentially affect the forecast dramatically.

In Operation 525, the forecast module receives a forecast type used to generate the forecast. Similar to campaign types, in various embodiments, forecast types that may be generated include an "entire" forecast or a "periodical" forecast. For an "entire" forecast, any selected target types and values are applied across the entire forecast. That is to say, each day and time interval will in effect count down towards the target. For a "periodical" forecast, each day and time interval will have its own selected targets to achieve. For this type, different days and time intervals can have different targets.

At this point, the user is taken to a screen that enables the user to review and amend the selected time period (e.g., days) of historical data that is to be used as a basis of the forecast. For instance, in one embodiment, the screen displays each day of the selected time period from the historical dataset (e.g., four weeks) and the number of events (e.g., communications placed or received) for each day. Thus, the user can review the days and events for each day to identify whether any particular days may be considered outliers that the user may want to exclude from the forecast. For example, a majority of the days may indicate that approximately four hundred and eighty events occurred for each day however one of the days may indicate that only three hundred events occurred on that day. This may be for any number of reasons such as, for example, a number of communication trunks may have been down that day or the data for the events may not have been recorded or may have been lost. Therefore, the user may want to exclude this day from the days used for generating the forecast. Thus, in Operation 530, the forecast module receives the dates (e.g., days) selected to include (or exclude depending on the embodiment) from the dataset.

Further, in particular embodiments, the user may also be able to review the specific data for each selected day to ensure the data is consistent and available for each day. For example, in one embodiment, the user may be provided with a missing values screen that provides a listing of selected days with missing values (e.g., data). For this embodiment, the user may select a day with missing values and may edit the values accordingly to address the missing values. If too many values are missing, the user may be able to clear the day from the selected dates for the dataset. Thus, in Operation 535, the forecast module determines whether the dataset has been edited. If so, the forecast module receives the edits to the dataset in Operation 540.

As described earlier, a number of parameters are defined when a campaign is generated and these originally defined parameters may be considered default parameters for the campaign. However, in various embodiments, the forecast module is configured to provide the user with the capability to edit the default parameters for the selected campaign if desired. Therefore, in these particular embodiments, the user edits the campaign's parameters such as, for example, the goals (e.g., target type and/or target value) for the campaign, the time period for which the campaign will be conducted, and the staff requirements (e.g., minimum and/or maximum agents required) for the campaign. Further, in particular embodiments, the user may indicate whether to enforce minimum staffing requirements for the campaign. If so, the forecast module allocates the minimum number of staff (e.g., agents) for all time intervals and/or queues in the forecast regardless of whether the target is met. Thus, in Operation 545, the forecast module determines whether parameters for the selected campaign have been edited. If so, the forecast module receives the edits in Operation 550.

At this point, the forecast module provides the user with a summary screen in various embodiments that shows the parameters to be used to generate the forecast (e.g., historical dataset, forecast start date, forecast type, etc.). If the user is happy with the parameters, the user selects "Finish" and the forecast module generates the forecast, shown as Operation 555. In particular embodiments, the module provides a generated forecast results screen that generally displays the number of communications forecasted to be placed and received during each defined time period (e.g., each time interval). (If applicable, the number of communications received being broken down by channel of communication.) In addition, the screen may include information such as, for example: (1) predicted average handle time(s) (AHTs) for handling inbound communications (for different channels of communication, if applicable); (2) predicted average response time(s) (ARTs) for receiving inbound communications once the outbound communications have been sent (for different channels of communication, if applicable); (3) a computed number (e.g., percentage) representing the number of inbound communications received for a particular channel of communication, if applicable; (4) a computed number (e.g., percentage) representing a party's preference for using a particular channel of communication, if applicable; and/or (5) a computed number of staff needed to handle the inbound communications (broken down by channel of communication, if applicable).

In particular embodiments, the forecast module may also provide the user with the capability to smooth the queues in the forecast. Smoothing a queue removes any sharp peaks or troughs in the generated forecasted staff for the particular queue which may allow for a more efficient shift pattern to be generated in order to meet the forecasted shift requirements.

Figure 6A:
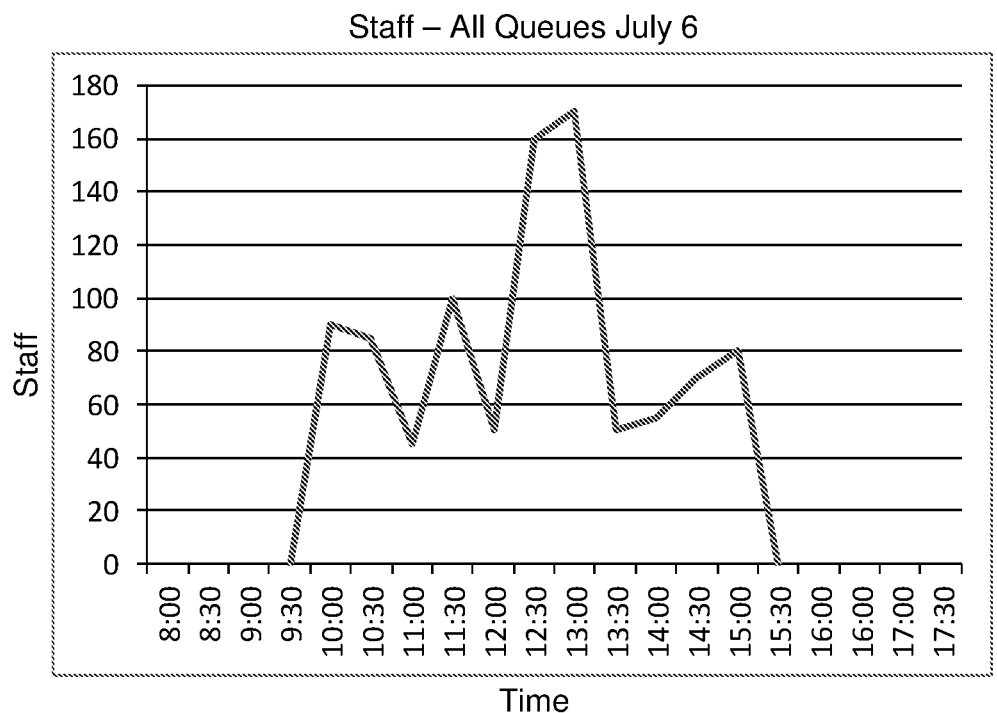
FIGS. 6A and 6B provide an example of smoothing a forecast in accordance with various embodiments of the present invention.
Figure 6B:
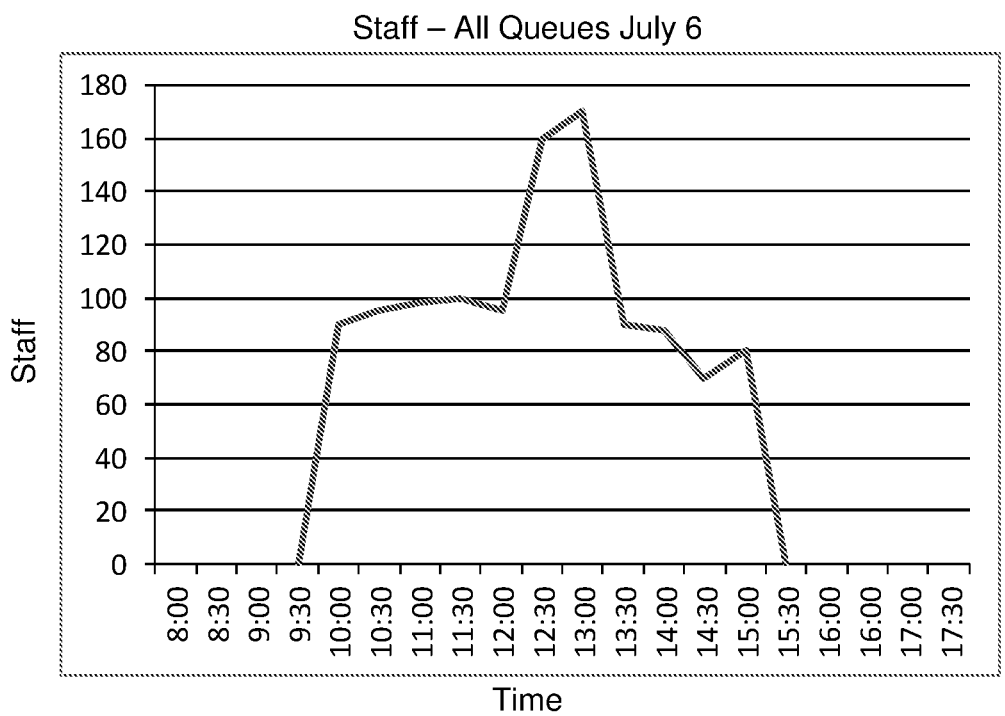

In one particular embodiment, the user selects the dates of the forecast to include in the smoothing process and the number of smoothing passes to make. Further, the user may indicate that a copy of the forecast is to be smoothed so that it may be compared to the original forecast. An example of smoothing the forecasted staff for all of the selected queues for a particular forecast on a selected date is shown in FIGS. 6A and 6B. FIG. 6A displays the forecasted staff prior to smoothing for all of the queues associated with the forecast for July 6th. FIG. 6B displays the forecasted staff after the staff has been smoothed for all of the queues associated with the forecast. As one can see, the peaks and troughs in the original forecast for the staff have been smoothed out. As a result, a more efficient shift pattern may be generated for the forecasted shift requirements.

Returning to FIG. 5, at this point, the user may decide whether the generated forecast is acceptable or whether to revise some of the parameters for the forecast and to regenerate the forecast. Thus, in Operation 560, the forecast module determines whether the user wishes to revise some of the parameters and to regenerate the forecast. If so, the forecast module returns to a point in the process where the user has an opportunity to revise the campaign for the forecast, the selected dataset, the forecast parameters, the forecast type, selected dates for the historical dataset, data in the dataset, and/or parameters for the selected campaign. Once the user finds the forecast acceptable, the user selects the "Save" button and the forecast module saves the forecast, shown as Operation 565. Once saved, the forecast may now be used to generate a roster template for conducting the campaign associated with the forecast.

Finally it is noted that in various embodiments, like the campaign module, the forecast module may provide additional capabilities such as the capability to copy an existing forecast, delete forecasts, and/or mark and manage inactive forecasts. One of ordinary skill in the art can envision other capabilities in light of this disclosure.

Roster Template Module

Figure 7:
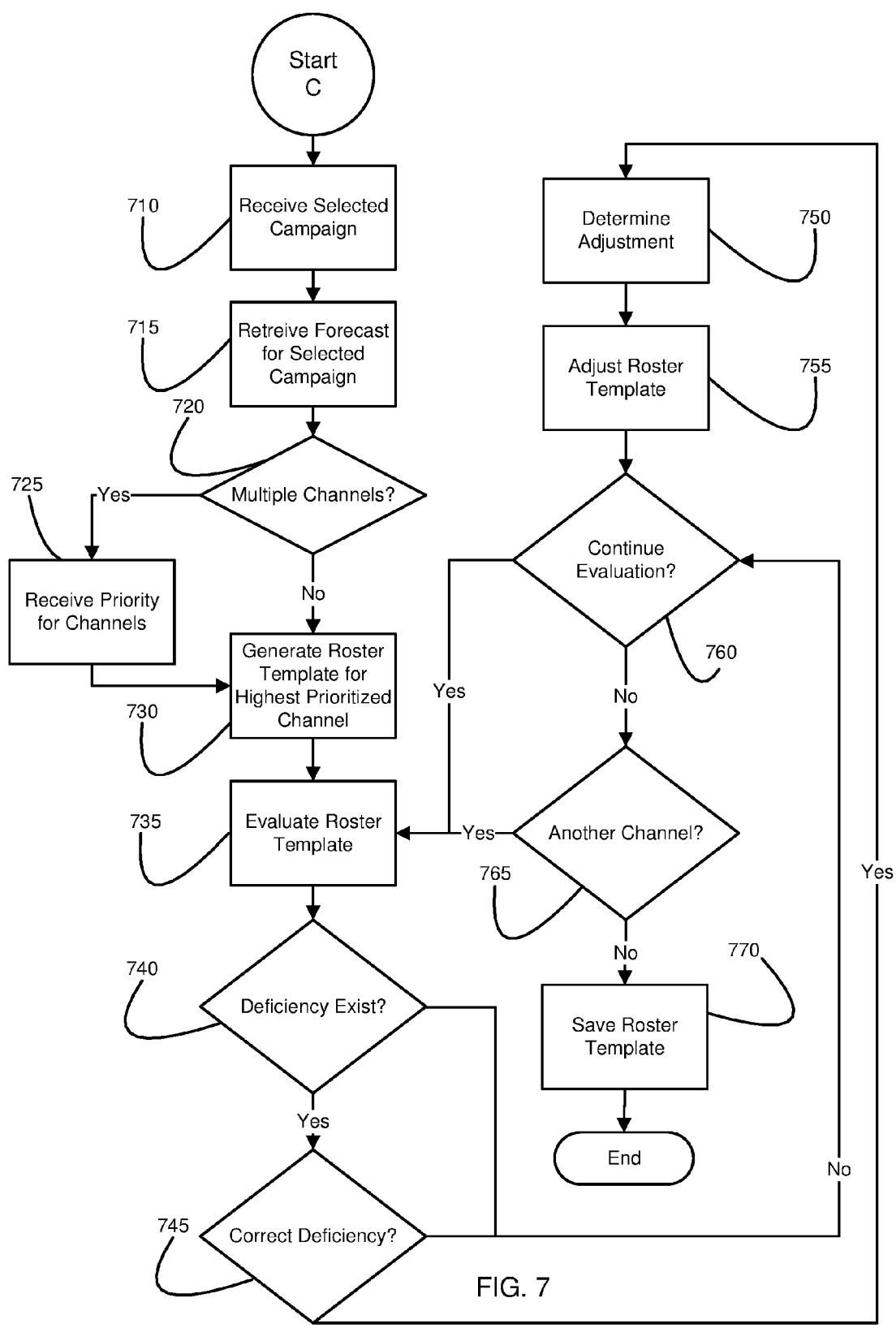
FIG. 7 is a flowchart illustrating a roster template module that can be used in accordance with various embodiments of the present invention.

Turning now to FIG. 7, additional details are provided regarding the process flow for generating and managing a roster template for a campaign involving sending outbound communications to generate inbound communications to the contact center. In particular, FIG. 7 is a flow diagram showing a roster template module for performing such functionality according to one embodiment of the invention. Similar to the campaign and forecast modules, in various embodiments, the roster template module may also be invoked by the manage schedule module described above whenever a user is to generate or manage a roster template for a campaign. However, it should be understood that in other embodiments, the roster template module may be a stand-alone computer program module. Thus, the flow diagram shown in FIG. 7 may correspond to operations carried out by a processor in a system, such as the WFM 155 for example, as it executes the roster template module stored in the system's volatile and/or nonvolatile memory.

Similar to the campaign and forecast modules, the roster template module is configured to enable a user to generate new roster templates and/or to modify existing roster templates according to various embodiments of the invention. For example, in one embodiment, the user is provided with an initial screen that provides a listing of existing roster templates from which the user may select a template to modify. Thus, the operations displayed in FIG. 7 may be carried out for a new or existing roster template. However, for purposes of this disclosure, it is assumed the user had indicated he would like to generate a new roster template.

Therefore, beginning with Operation 710, the roster template module receives a selection of a campaign involving sending outbound communications to generate inbound communications in which the inbound communication may make use of one or more channels of communication. For instance, the selected campaign may involve sending SMS text messages to individuals requesting the individuals to get in touch with the contact center by placing an inbound call or inbound SMS text message to the contact center. Accordingly, in particular embodiments, the roster template module provides a listing of campaigns from which the user may select the desired campaign.

Once the campaign have been selected, the roster template module retrieves the forecast generated for the selected campaign in Operation 715. In particular embodiments, if a forecast has not yet been generated for the particular campaign, the roster template module may inform the user of such and may invoke the forecast module so that the user may generate a forecast for the campaign.

Accordingly, in Operation 720, the roster template module determines whether the selected campaign involves generating inbound communications that make use of multiple channels of communication. If so, then the user may prioritize the channels in various embodiments and the roster template module receives the priority for the various channels in Operation 725.

As previously mentioned, the channels of communication are prioritized in various embodiments with respect to importance of meeting the needs of handling the inbound communications associated with the different channels. Generally speaking, some channels of communication such as, for example, telephone calls and Web chats are typically viewed as communications that should be addressed almost immediately upon receiving them. This is because such a communication typically has a party who has placed the communication that is actively present on the communication and ready to interact with another party on the communication. Thus, most contact centers consider such communications should be handled quickly upon receiving them so that the parties who have placed the communications can be serviced in an effective manner and have a pleasant and positive experience. Although many contact centers do make use of queues to hold such communications when agents are not immediately available to handle them, most of these contact centers still try to service these communications as quickly and efficiently as possible since the expectation of a party who has placed such a communication is that the communication will reach an agent quickly who can efficiently and effectively handle the communication.

However in contrast, other channels of communication such as, for example, emails are typically viewed as communications that are not necessarily required to be addressed immediately upon receiving them. This is because many parties who send such communications do not normally expect an immediate response to such a communication and thus are not actively present on the communication waiting for a response. Therefore, many contact centers do not consider such communications need to be handled immediately upon receiving them and may defer such communications to a later time when the contact center has sufficient resources (e.g., agents) to handle them.

With that said, other channels of communication such as, for example, SMS text messages may be viewed as lying between a communication that should be addressed almost immediately upon receiving it and a communication that is not necessarily required to be addressed immediately upon receiving it. This is because although a party may not expect a response to a SMS text message to be sent immediately upon sending it, a party generally expects to receive a response to a SMS text message within a short amount of time after sending it.

Accordingly, once the user has identified the priorities for the different channels of communication, the roster template module receives the information in Operation 725. At this point, the roster template module generates a roster template for the highest prioritized channel of communication that satisfies the requirements (needs) identified by the forecast generated for the campaign in Operation 730. Accordingly, in various embodiments, the roster template module generates a roster template for the highest prioritized channel of communication that identifies the types of shifts needed to meet the requirements of the forecast for inbound communications received using the channel of communication and calculates how many instances of each shift are required based on the forecast (e.g., shift profile). In addition, the generated roster template may also identify the type and number of staff required to work each individual shift (e.g., staffing profile), the skills required for each individual shift to ensure only staff with the appropriate skills work that shift (e.g., skills profile), and/or breaks or other scheduled activities (e.g., training) that are to occur during each individual shift (e.g., activity profile). Depending on the embodiment, the shift profile, staffing profile, and/or activity profile are configured based on parameters defined for the selected campaign and/or other rules established for the contact center. For example, the campaign may include parameters defining the skills required to work on the campaign. Further, the contact center may be required to provide each staff member a thirty minute break for lunch if the staff member works a shift of eight hours or more. Thus, in various embodiments, the roster template module makes uses of these defined parameters and rules in forming the staffing, skills, and/or activity profiles for each generated shift.

Once the roster template has been generated, the user can review the shifts and make any necessary revisions. For instance, in various embodiments, the roster template module may provide the user with the capability to add or revise shifts. For example, a shift may be revised to increase the staffing profile associated with a shift to include additional staff to work the shift. That is, when the roster template module generated the roster template, the module may have identified a 9:00 a.m. to 5:00 p.m. shift requiring twelve agents to work the shift for one or more days. However, the user may also like to assign a supervisor to work the shift as well. Therefore, the user revises the shift to add the supervisor to the staffing profile for the 9:00 a.m. to 5:00 p.m. shift. Similar types of revisions can be made to skills profiles and the activity profiles for the various shifts as well as to shifts themselves in various embodiments.

Once the user indicates he is satisfied with the configuration of the roster template, the roster template module evaluates the roster template based on the requirements (needs) identified in the forecast generated for the next highest prioritized channel of communication in Operation 735. That is to say, the roster template module evaluates the roster template to determine whether the shifts and corresponding staff identified in the template would adequately staff the next highest prioritized channel of communication.

Accordingly, the contact center may define in various embodiments one or more parameters (e.g., rules) used to evaluate the roster template to determine whether the template adequately staffs the next highest prioritized channel of communication. For instance, the contact center may define a threshold number or percentage of communications or required staff that may identify an instance in which the roster template does not adequately staff the next highest prioritized channel of communication (a deficiency). For example, the contact center may define a parameter identifying a percentage of communications and/or required staff identified in the forecast generated for the next highest prioritized channel of communication that must be addressed and/or provided for by the roster template.

For instance, the forecast generated for the next highest prioritized channel of communication may identify required staff of thirty, twenty-five, twenty, and thirty-five needed to handle the number of communications predicted to be received via the channel of communication for thirty-minute time intervals beginning at 9:00 a.m. and ending at 11:00 a.m. for a particular weekday. That is to say, the forecast indicates that thirty agents are needed from 9:00 a.m. to 9:30 a.m., twenty-five agents are needed from 9:30 a.m. to 10:00 a.m., twenty agents are needed from 10:00 a.m. to 10:30 a.m., and thirty-five agents are needed from 10:30 a.m. to 11:00 a.m. to handle the number of communications predicted to be received via the channel of communication in the forecast for the particular weekday. In this instance, the roster template includes a shift for the particular weekday beginning at 8:00 a.m. and ending at 4:00 p.m. that identifies thirty agents to work during the shift and the contact center has defined a parameter that at least eighty percent of the staff required for any time interval in the forecast must be actually scheduled.

Thus, in this example, the roster template module determines a deficiency exists in Operation 740 in that the time interval from 10:30 a.m. to 11:00 a.m. on the weekday requires thirty-five agents to work to handle the number of communications forecasted to be received via the channel of communication for the time interval, however the roster template only identifies thirty agents to work the shift during this time interval. Accordingly, the roster template module determines whether the deficiency needs to be addressed in Operation 745. Thus, in this instance, the contact center requires that at least eighty percent of the staff required by the forecast for any time interval be actually staffed for the particular time interval. Therefore, the roster template module determines the deficiency does not need to be addressed since the roster template provides for thirty agents during the time interval, which equals to eighty-six percent of the staff required for the interval.

It should be noted that in this instance, the contact center's agents are able to handle communications for the next highest prioritized channel of communication at the same time the agents are able to handle communications for the highest prioritized channel of communication. Therefore, each of the thirty agents working during the shift from 8:00 a.m. to 4:00 p.m. on the particular weekday can handle a communication for the highest prioritized channel of communication and a communication for the next highest prioritized channel of communication at virtually the same time. However if this were not the case, then the roster template may come to a different determination at Operation 745.

For example, if the highest prioritized channel of communication is inbound calls and the next highest prioritized channel of communication is inbound Web chats and agents at the contact center can only handle an inbound call or inbound Web chat at any particular time, then an agent handling an inbound call for the highest prioritized channel of communication cannot handle an inbound Web chat for the next highest prioritized channel of communication at virtually the same time. Therefore, the deficiency described above would need to be addressed by the roster template module since eighty percent of the staff required for the time interval is not being actually staffed.

The same would be determined had the 10:30 a.m. to 11:00 a.m. time interval required forty staff members instead of thirty-five staff members. In this instance, the roster template module would determine the deficiency needs to be addressed since the roster template provides for only seventy-five percent of the staff required for the interval. Therefore, the roster template module determines what adjustment must be made to the roster template to address the deficiency in Operation 750. In this instance, at least two additional staff members need to be added to the shift in the template to adequately address the deficiency. Accordingly, the roster template module could simply add two additional staff members to the shift to address the deficiency. However, this solution may not always be available. For instance, the contact center may have a maximum number of agents that are allowed to work in a week and that number may have already been reached with respect to the total number of agents required for all of the shifts in the roster template for the week. Therefore, the roster template module cannot just simply be modified to provide two additional agents to the shift to address the deficiency in the template.

Instead, the roster template module may determine to move two agents from a different shift to the shift with the deficiency to address the deficiency. For example, a second shift may be included in the roster template for the particular weekday that runs from 1:00 p.m. to 9:00 p.m. that currently has thirty-seven staff identified for the shift. Accordingly, the roster template module may adjust the roster template in Operation 755 and move two of the agents from this shift to the shift with the deficiency. As a result, the shift that runs from 8:00 a.m. to 4:00 p.m. now has thirty-two agents identified for the shift in the roster template and the shift that runs from 1:00 p.m. to 9:00 p.m. now has thirty-five staff identified for the shift in the roster template. Furthermore, the deficiency has been addressed.

In other instances, the roster template module may determine to adjust when the outbound communications that cause the inbound communications to be received for the channel of communication to lower the number of agents needed during the 10:30 a.m. to 11:00 a.m. time interval. For example, the second shift has thirty-seven staff identified for the shift and the forecast may indicate that only thirty-five staff members are required to handle the inbound communications received during the second shift for this channel of communications. Therefore, the roster template may adjust the number of outbound communications so that less inbound communications are received during the first shift and more inbound communications are received during the second shift. For example, the roster template module may delay sending some of the outbound communications so that the generated inbound communications are not received until the second shift. Accordingly, the number of staff required to handle inbound communications received via the next highest prioritized channel of communication is lowered.

It should be noted that by adjusting the number of staff and/or when certain outbound communications are sent to address the deficiency with respect to the next highest prioritized channel of communication typically affects the contact center's ability to handle the inbound communications received via the highest prioritized channel of communication. Therefore, the roster template module in various embodiments is configured to verify the roster template is still adequately staffed with respect to the highest prioritized channel of communication once a change has been made to the roster template to address a deficiency with respect to the next highest prioritized channel of communication. Furthermore, in many instances, the roster template module may be required to address a deficiency by making changes to the roster template that include both adjusting the number of staff and when certain outbound communications are sent in order to address a deficiency.

At this point, the roster template module determines whether to continue to evaluate the roster template in light of the current next highest prioritized campaign in Operation 760. That is to say, the roster template module determines whether any additional requirements in the forecast for the next highest prioritized campaign need to be considered based on the remaining shifts defined in the roster template and parameters defined by the contact center to ensure the channel of communication will be adequately staffed using the roster template. If so, then the roster template returns to Operation 735 and continues the evaluation.

However, if the roster template module has completed the evaluation of the roster template with respect to the current next highest prioritized channel of communication, then the roster template determines whether there are any additional channels of communication to consider in Operation 765. If so, then the roster template moves to the next highest prioritized channel of communication and returns to Operation 735 and carries out the operations described above with respect to this channel of communication. Once all of the channels of communication have been considered, the roster template module saves the roster template in Operation 770. At this point, a roster template has been developed based on the forecast generated for the campaign involving sending outbound communications to generate inbound communications to the contact center. This roster template may now be applied to staff of the contact center to generate a schedule for conducting the campaign.

Finally it is noted that in various embodiments, like the campaign and forecast modules, the roster template module may provide additional capabilities to a user such as the capability to copy an existing roster template, delete templates, and/or mark and manage inactive templates. One of ordinary skill in the art can envision other capabilities in light of this disclosure.

Schedule Module

Figure 8:
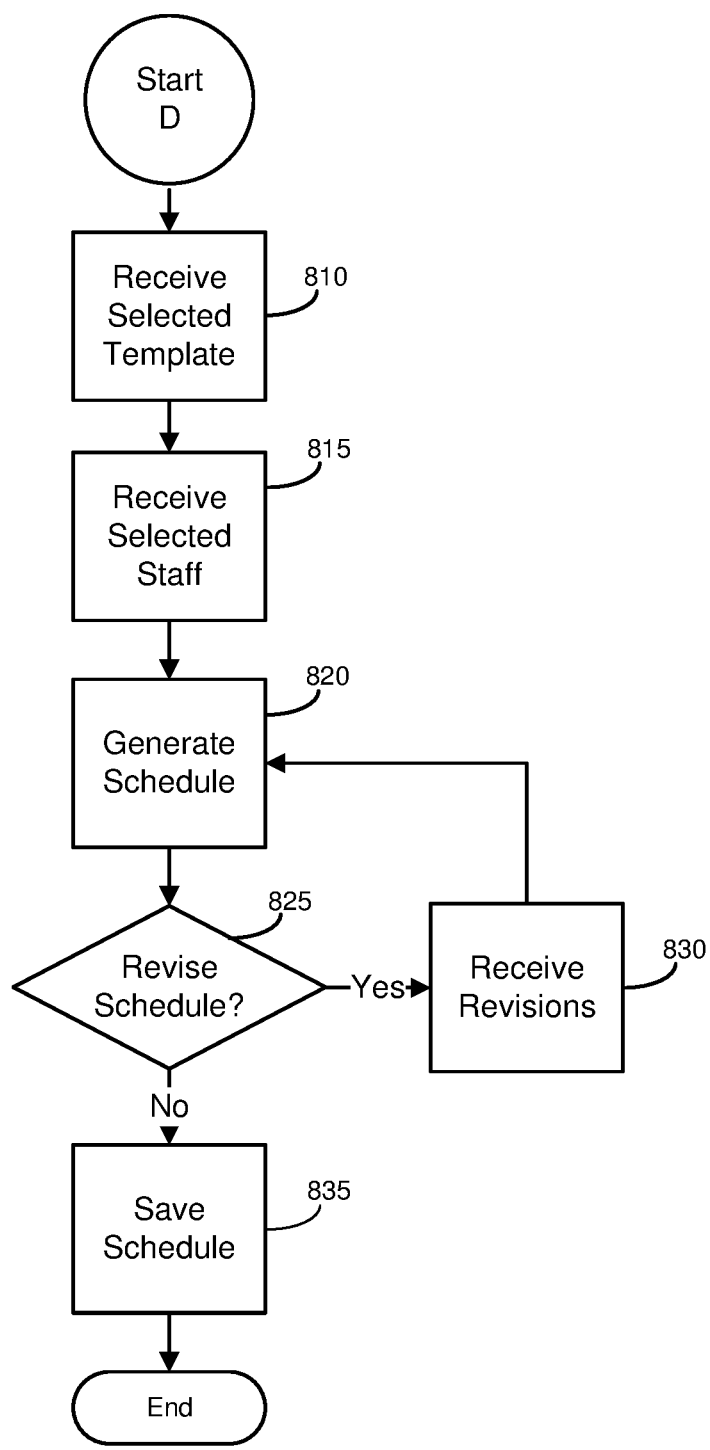
FIG. 8 is a flowchart illustrating a schedule module that can be used in accordance with various embodiments of the present invention.

Turning now to FIG. 8, additional details are provided regarding the process flow for creating and managing schedules for campaigns. In particular, FIG. 8 is a flow diagram showing a schedule module for performing such functionality according to one embodiment of the invention. Similar to the campaign, forecast, and roster template modules, in various embodiments, the schedule module may also be invoked by the manage schedule module described above whenever a user generates or manages one or more schedules for campaigns. However, it should be understood that in other embodiments, the schedule module may be a stand-alone computer program module. Thus, the flow diagram shown in FIG. 8 may correspond to operations carried out by a processor in a system, such as the WFM 155 for example, as it executes the schedule module stored in the system's volatile and/or nonvolatile memory.

Similar to the campaign, forecast, and roster template modules, the schedule module is configured to enable a user to generate new schedules and/or to modify existing schedules according to various embodiments of the invention. For example, in one embodiment, the user is provided with an initial screen that provides a listing of existing schedules from which the user may select a schedule to modify. Thus, the operations displayed in FIG. 8 may be carried out for a new or existing schedule. However, for purposes of this disclosure, it is assumed the user has indicated he would like to generate a new schedule based on an existing roster template for a campaign involving sending outbound communications to generate inbound communications to the contact center.

Generally, the schedule module in various embodiments is configured to generate a schedule by allocating staff to an existing roster template that has been created for a campaign. The goal is that when the schedule is generated, the schedule meets the requirements of the corresponding forecast for the campaign and the subsequent roster template. In general, a "schedule" is understood to be a set of shift cycles with specific staff allocated to the shifts. In many instances, the schedule applies to a particular location of a contact center. However, in other instances, the schedule may apply to multiple locations of the contact center. For purposes of this disclosure, a "shift cycle" is understood to be a series (e.g., group) of shifts. Depending on the embodiment, a shift cycle may be generated to contain any realistic sequence of shifts and can be any length. For example, a shift cycle may include a day shift, an evening shift, and a night shift for each day of seven consecutive days (e.g., a week) totaling twenty-one shifts for the shift cycle.

In various embodiments, the schedule module uses availability information for each staff member to determine how a member is allocated to the shifts. Depending on the embodiment, this availability information may be made available through any number of different mechanisms such as, for example, one or more databases storing information on staff members or through a manage roster program used to manage the staff members of the contact center and their corresponding information.

Turning now to FIG. 8, the user reviews a listing of existing roster templates presented on a computer screen and selects the appropriate roster template from the listing. In turn, the schedule module receives the selected roster template in Operation 810. At this point, the user identifies the staff to apply to the selected roster template. In various embodiments, the user is provided with a screen that allows the user to pick a location where to save the schedule and one or more staff to apply to the roster template. As previously described, staff is one or more human resources (e.g., employees) of the contact center and may be further limited as those human resources sharing common attributes. For instance, a staff may be one or more human resources working at a particular location.

After selecting one or more staff, the user is provided with a "Select Staff" screen in particular embodiments. Such a screen enables the user to manually include and/or exclude members of the selected staff from being placed on the schedule. For example, in one embodiment, the screen may show a listing of all of the staff members along with a checkbox beside each staff member's name. The checkbox for each member may be initially checked indicating the staff member is eligible to be scheduled and the user goes through the list of members and un-checks the checkboxes for any members the user would like to exclude from being scheduled.

In addition, in particular embodiments, the screen may provide the user with other capabilities to identify staff members eligible to be scheduled (e.g., to apply to the roster template). For instance, in one embodiment, a checkbox may be provided that indicates to "use only primary skills." If checked, the schedule module only allocates staff members with the appropriate primary skills to shifts in the roster template that require those skills in the skills profile. In addition, in another embodiment, some of the members may have a base roster defined that indicates the members are scheduled for the same work shifts over a defined period of time (e.g., weekly). That is say, for example, a particular staff member with a base roster may receive the same shifts on the same days for every schedule. In this embodiment, the screen may allow the user to indicate whether staff members' base rosters should be ignored or adhered to, or whether such members should be excluded from the staff applied to the roster template.

After the user has indicated the one or more staff to apply to the selected roster template, the schedule module receives the selection in Operation 815. In turn, the schedule module generates a schedule based on the selected roster template and staff, shown as Operation 820. The resulting schedule comprises the shifts identified in the roster template populated with identified members of the selected staff.

As previously mentioned, in various embodiments, the schedule module is configured to apply availability information for each of the staff members in populating the different shifts of the schedule. In addition, in various embodiments, the schedule module makes use of other information and rules associated with the campaign, roster template, and/or contact center in populating the shifts of the schedule with staff members. For instance, in particular embodiments, the roster template defines skills required to be assigned to particular shifts of the schedule and the schedule module considers these skills requirements in determining which members of the staff are to work a particular shift.

One important aspect that is considered in various embodiments is a staff member's skills in handling different channels of communication at virtually the same time since the campaign being scheduled may involve using different channels of communication for inbound traffic. Thus, the schedule module may consider each staff member's skills in handling the channels of communication associated with the campaign in considering whether to schedule them or not for shifts. Specifically, the skills defined for a first staff member may indicate the member is able to handle a call and at least one of a Web chat and a SMS text message at virtually the same time. While the skills defined for a second staff member may indicate the member is only able to handle a call, a Web chat, or a SMS text message at any one time and therefore is not able to handle multiple communications at virtually the same time. Therefore, the schedule module may likely only consider the first staff member as eligible to work the shifts for the campaign if the staff working these shifts is likely to have to be able to handle multiple communications at virtually the same time.

In addition, another related skill the schedule module may consider in determining whether to schedule a particular staff member is the particular staff member's average handle times ("AHTs") in handling communications involving the different channels of communication. For instance, two different staff members may be able to handle a call and a Web chat at virtually the same time. However, the first staff member's AHT for a Web chat is twelve minutes while the second staff member's AHT for a Web chat is ten minutes. Accordingly, the schedule module may consider scheduling the second staff member over the first staff member for the shifts since the second staff member typically handles Web chats faster than the second staff member.

At this point, the user may review the generated schedule to determine whether the schedule is acceptable or whether the schedule should be revised. For instance, in various embodiments, the user is provided with one or more screens for reviewing details of the schedule and/or the roster template and making any necessary revisions accordingly. For example, in particular embodiments, the user is provided with the capability to review and revise the various profiles (e.g., shifts, staffing, skills, and activities) of the roster template as appropriate and have the schedule module regenerate the schedule. Depending on the embodiment, such revisions to the roster template may be permanently applied to the roster template or may only be applied in the context of the currently generated schedule.

In addition, contact centers may also implement rules in various embodiments that are to be followed by the schedule module when creating a schedule. For instance, in particular embodiments, contact centers may implement rules with respect to how much and/or how often staff members are allowed to work at the contact centers and/or on campaigns (e.g., hours rules). For example, the schedule module may apply one or more rules for the minimum hours that should be provided between shifts, the maximum number of consecutive shifts a staff member can work, the maximum number of shifts a staff member can work before being given time off, the maximum shift length, and/or the maximum and minimum number of minutes between breaks.

Further, the schedule module may apply similar types of rules for taking time off (e.g., days off rules). For example, in one embodiment, the schedule module may apply one or more days off rules for the number of consecutive days off a staff member is supposed to receive, what days are considered preferred days off (e.g., weekend days), and/or preferred days off patterns that specify a preferred number of days given off in a row for a specified number of times. Thus, in various embodiments, the user may be provided with the capability to revise these rules, such as hours rules and/or days off rules, to be applied in generating the schedule.

Furthermore, the user may also be provided with one or more screens in particular embodiments to set a weight associated with the application of various rules used during the schedule generation process. That is say, in these particular embodiments, the user may indicate which rules carry more weight to provide the schedule module with an order in which to fulfill the requirements of the rules surrounding the schedule generation process. For instance, in one embodiment, the user is provided with a screen listing the different rules to be applied during the schedule generation process and each rule is associated with a field in which the user can type in a "weighting factor" for the particular rule to identify the amount of weighting that rule should be given during the schedule generation process. For example, by increasing the weighting factor of the rule for the number of consecutive days off a staff member is supposed to receive the schedule module places a relative emphasis on adhering to this rule when generating the schedule. That is say, the schedule module places more emphasis on the importance of adhering to this rule than to other rules with a lesser weighting factor. In other embodiments, a default set of values can be used for the various weighting factors.

In addition, the user may also be provided with the option to set a shift fill factor on a particular screen that represents a percentage of staff that should be scheduled for a shift by the schedule module before the module moves on to schedule staff for the next shift. Setting a shift fill factor may be used to evenly populate all the shifts across the entire schedule. For example, suppose the shift fill factor has been set to twenty percent and the roster template requires ten agents to be scheduled for each shift. When the schedule module generates the schedule, the module initially schedules two agents for each shift across the entire schedule (i.e., twenty percent of the staffing requirement). Thereafter, the schedule module continues to cycle through the shifts and schedule twenty percent of the staffing requirement for each shift until either the shifts are filled or no more agents are available to schedule. Accordingly, a schedule is generated that ensures at least a minimal number of agents are working each shift on the schedule as a result of setting a shift fill factor.

In addition, in particular embodiments, the user may also be given the option to set a fill strategy that identifies the method used by the schedule module to fill the shifts in the schedule. For instance, the user may be given the option to set the fill strategy to fill by utilization. For this strategy, the schedule module assesses how difficult it is to populate each shift and then fills the shifts in the schedule in an order of the most difficult shifts to fill to the easiest shifts to fill. In some embodiments, the schedule module determines how difficult a shift is to populate based upon how many staff members are required to fill the shift and divides that by the number of staff members available to work the shift. Other options to set for the fill strategy may include filling the shifts in chronological order from the beginning of the schedule or permitting the schedule module to randomly select how to fill the shifts.

In various embodiments, the user may also be provided with the option to set shift counts rules. Such rules enable the user to identify which shifts are not to be over-scheduled with staff, which shifts are to be considered last in the scheduling staff allocation, and/or how many staff can be allocated to a particular shift. In these particular embodiments, the user may be provided with one or more screens for setting shift counts rules. For example, in one embodiment, the rules for not over-scheduling shifts or for considering shifts last in the staff allocation are each associated with a listing of the entire shifts for the schedule. To apply a rule to a particular shift, the user selects the shift (e.g., checks the checkbox) in the appropriate listing for the rule. As for the rule setting the number of staff that can be allocated to a particular shift, this rule may also be associated with a listing of the entire shifts for the schedule in which the user may enter a value for the maximum number of staff that can be allocated to any particular shift. As a result, when the schedule module generates the schedule, the module takes into consideration the shifts that have been identified for each shift counts rule.

Further, in various embodiments, the user may also be provided with options to define additional allocation rules to be followed when the schedule module generates the schedule. For example, in particular embodiments, the user may be provided the option to set allocation for permanent staff, casual staff (e.g., temporary and/or seasonal staff), full-time staff, part-time staff, union staff, non-union staff, etc. to a percentage. For example, if allocation is set to one hundred percent for permanent staff, permanent staff who fit the selected criteria are allocated shifts until they are scheduled to work their maximum number of hours allowed. Likewise, if allocation is set to one hundred percent for casual staff, casual staff who fit the selected criteria are allocated shifts until they are scheduled to work their maximum number of hours allowed. Further, the user may be provided with an option to set an indicator for which type of employee (e.g., permanent or casual) is given preference in filling a shift vacancy.

Other examples of options that may be provided in various embodiments include an option to schedule staff based upon defined staff links. For example, in particular embodiments, contact centers may make use of a manage roster program and to define properties for each staff member. These defined properties may be stored in non-volatile memory such as, for example, in one or more databases residing on a data store 175 within the contact center architecture 100. Depending on the embodiment, the properties may include such information as a staff member's personal details such as home address and phone number, details about the member's work such as location where the member works, the team the member belongs to, and position the member holds, the hours the member is available to work (e.g., availability information), the skills the member holds, any shifts requests by the member, and/or other similar information.

In particular embodiments, the staff members' information includes "staff links" used to link staff members together to indicate that such members must either work together or never work together. For example, a contact center may want to establish a staff link between two members to always work together so that one of the members can act as a mentor to the other member or so a new member who is taking over for an existing member can work alongside the existing member to learn the existing member's job. Further, a contact center may want to establish a staff link between two members to never work together to ensure two members who have in-depth knowledge on a particular subject are never scheduled together so as to allow the knowledge to be shared across the shifts. Thus, in particular embodiments, the user may be provided with the option to indicate that such links should be adhered to by the schedule module during the schedule generation process.

Another option that is provided to the user in various embodiments is whether staff costs should be taken into consideration by the schedule module during the schedule generation process. In these particular embodiments, if the staff cost option is selected, the schedule module generates the cheapest possible schedule based upon the defined staffing costs (e.g., based upon the hourly rates defined for each of the staff members). Another option includes whether overtime is allowed. If this option is selected, the schedule module is permitted to schedule staff members for more hours than their pre-defined maximum hours to ensure adequate staffing for the schedule. Other options that may be included in various embodiments are (1) whether start times for staff members should occur within a defined range, (2) whether to ensure staff are allocated to shifts in a way that roughly evens out the hours allocated to members by a percentage, (3) whether breaks should be automatically included in the schedule based on predefined break rules, (4) whether location hours should be considered in scheduling staff members for shifts, and (5) whether a staff member only receives a shift if the member has the skill(s) required for the shift.

Returning now to FIG. 8, the user may review the schedule details and revise any of the parameters described above with respect to the schedule. Thus, in Operation 825, the schedule module determines whether any such parameters have been revised. If so, the schedule module receives the parameters, at Operation 830, and re-generates the schedule based on the revisions, in Operation 820. This process continues until the user is satisfied with the schedule. At that point, the user chooses to save the schedule and the schedule module saves the schedule in the appropriate location, shown as Operation 835.

At this point, the schedule may now be used to carry out the campaign tied to the schedule. In addition, as previously described, the schedule may be revised as the campaign is carried out based on actual performance to adjust the schedule to be better aligned with the campaign's goals.

Finally it is noted that in various embodiments, like the campaign, forecast, and roster template modules, the schedule module may provide additional capabilities such as the capability to copy an existing schedule, delete schedules, and/or mark and manage inactive schedules. One of ordinary skill in the art can envision other capabilities in light of this disclosure.

First Example to Demonstrate Functionality of Various Embodiments

A first example is now provided to help demonstrate the functionality of various embodiments of the invention. Those of ordinary skill in the art should understand that this example is provided for demonstration purposes only and should not be construed to limit the scope of various embodiments of the invention.

In this example, a contact center has been contracted to conduct a campaign that involves sending outbound SMS text messages to thirteen thousand individuals advertising a company's products and providing each individual with the option of placing an inbound call or reply SMS text message to request additional information on the company's products. Therefore, the contact center will be required to utilize its staff to handle both incoming telephone calls and SMS text messages during the campaign.

In this instance, agents at the contact center are generally able to handle different channels of communication at virtually the same time. Specifically, an agent at the contact center can handle an inbound call while also handling a SMS text message. In addition, the contact center operates daily from 9:00 a.m. to 9:00 p.m. with two shifts. The first shift runs from 9:00 a.m. to 5:00 p.m. (the morning shift) and the second shift runs from 1:00 p.m. to 9:00 p.m. (the afternoon shift). Accordingly, an administrator at the contact center creates the campaign via the campaign module and generates a forecast for the campaign using the forecast module.

FIG. 9 provides a table representation of the results for a day showing the forecasted communications for the campaign. Specifically, the number of outbound SMS text messages to be sent are shown in the first row 910 titled "Outbound SMS." For instance, as one can see in the table, the contact center plans to send out two-thousand SMS text messages 915 at 9:00 a.m. It should be noted that depending on the circumstances the forecast performed for the campaign may predict that the two-thousand SMS text messages 915 should be sent at 9:00 a.m. or the contact center may define sending the two-thousand SMS text messages 915 at 9:00 a.m. as a campaign parameter. Accordingly, the second row 920 entitled "Inbound Calls" shows the number of expected inbound calls for each time interval and the third row 925 entitled "Inbound SMS" shows the number of expected inbound SMS text messages for each time interval. Therefore, the table shows the number of communications sent and received during each fifteen minute time interval for the campaign.

In this example, the forecast conducted for the campaign determines that 4.6% of outbound SMS text messages result in an inbound call to the contact center and 13.9% of outbound SMS text messages result in an inbound SMS text message to the contact center. Therefore, the contact center can expect to receive ninety-two inbound calls and two-hundred and seventy-eight inbound SMS text messages from sending two thousand outbound SMS text messages. In addition, the average response time for a call is thirty-three minutes with a standard deviation of seven minutes. While the average response time for a SMS text message is sixteen minutes with a standard deviation of four minutes. Accordingly, the table provided in FIG. 9 shows the forecast predicts to receive the highest number of inbound calls during the 3:30 p.m. time interval (57 930) and the highest number of inbound SMS text messages during the 3:15 p.m. time interval (137 935).

However with that said, in particular embodiments the forecast may further break down these percentages based on when the outbound communications are sent. For instance, in the example, the forecast may indicate 4.6% of outbound SMS text messages sent at 9:00 a.m. result in an inbound call to the contact center and 13.9% of outbound SMS text messages sent at 9:00 a.m. result in an inbound SMS text message to the contact center. In addition, the forecast may break these percentages down further and indicate 5.3% of outbound SMS text messages sent at 11:00 a.m. result in an inbound call to the contact center and 15.1% of outbound SMS text messages sent at 11:00 a.m. result in an inbound SMS text message to the contact center, and so forth for the remainder of times when outbound SMS text messages are sent. Furthermore, the forecast may do the same in particular embodiments with respect to average response times. That is to say, the forecast may break down the average response times for the different channels of inbound communication based on when the outbound communications are sent. Thus, in various embodiments, the forecast generated for the campaign may be more fine-tuned to account for the effects of when the outbound communications are sent to the various parties.

Turning now to FIG. 10, the table in this figure provides the number of agents needed to handle the forecasted number of communications received during each time interval for each channel of communication. In this instance since each time interval is fifteen minutes, the duration of a time interval is nine-hundred seconds. Looking at the 9:30 a.m. time interval for inbound calls, the campaign requires seven agents 1010 to handle the twenty-three inbound calls predicted to be received during this time interval. For this particular embodiment, the forecast module calculates this number by using the formula shown in Equation 1:

$$\text{\# of agents needed} = (\text{\# of communications} * \text{AHT}) / \text{ATAGH} \qquad \text{Eq. 1}$$

wherein ATAGH=an amount of time an agent can handle communications during the interval In this particular instance, the AHT for an inbound call is two-hundred and fifty-seven seconds. Therefore, the forecast module calculates (23 inbound calls*257 seconds)/900 seconds=7 agents needed during the 9:30 a.m. time interval to handle the expected inbound calls (the number of agents is rounded to the nearest whole number).

In this particular example, the contact center provides agents with two fifteen minute breaks and a thirty minute lunch/dinner break during a shift. Depending on the circumstances, these breaks may be set up as parameters for the contact center or for the individual campaign that the forecast module considers in determining the number of agents needed for each time interval. Specifically, during the morning shift that runs from 9:00 a.m. to 5:00 p.m., the contact center provides each agent with a fifteen minute break during the hour from 10:00 a.m. to 11:00 a.m., a lunch break during the hours from 12:00 p.m. to 2:00 p.m., and another fifteen minute break during the hour from 3:00 p.m. to 4:00 p.m. Likewise, during the afternoon shift that runs from 1:00 p.m. to 9:00 p.m., the contact center provides each agent with a fifteen minute break during the hour from 2:00 p.m. to 3:00 p.m., a dinner break during the hours from 4:00 p.m. to 6:00 p.m., and another fifteen minute break during the hour from 7:00 p.m. to 8:00 p.m.

Accordingly, during the hour from 10:00 a.m. to 11:00 a.m., only seventy-five percent of the agents who are working are actively handling communications since twenty-five percent of the agents will be on break at any given time during this hour. Likewise, the same can be said for the hours from 12:00 p.m. to 1:00 p.m., 5:00 p.m. to 6:00 p.m., and 7:00 p.m. to 8:00 p.m. However, during the hours from 1:00 p.m. to 2:00 p.m., 2:00 p.m. to 3:00 p.m., 3:00 p.m. to 4:00 p.m., and 4:00 p.m. to 5:00 p.m., the first and second shifts overlap each other. Therefore, during these hours, eighty-seven and a half percent of the agents who are working are actively handling communications since twelve and a half percent of the agents will be on break at any given time during these hours.

Thus, in this particular embodiment, the forecast module calculates the number of agents needed during the 10:00 a.m. time interval by the formula shown in Equation 2:

$$\text{\# of agents needed} = (\text{\# of communications} * \text{AHT}) / (\text{ATAGH} * 0.75) \qquad \text{Eq. 2}$$

wherein ATAGH=an amount of time an agent can handle communications during the interval Therefore, the forecast module calculates (11 inbound calls*257 seconds)/(900 seconds*0.75)=4 agents 1015 needed during the 10:00 a.m. time interval to handle the expected inbound calls.

The forecast module also calculates the agents needed for the inbound SMS text messages in the same manner. However, the AHT for an inbound SMS text message is one-hundred and twenty-one seconds. Therefore, the forecast module calculates (63 inbound SMS messages*121 seconds)/900 seconds=8 agents 1020 needed to handle the expected SMS text messages during the 9:30 a.m. time interval. Likewise, the forecast module calculates (21 inbound SMS text messages*121 seconds)/(900 seconds*0.75)=4 agents 1025 needed to handle the expected SMS text messages during the 10:00 a.m. time interval.

At this point, the administrator decides to generate a roster template for the campaign. Accordingly, the administrator invokes the roster template module and selects the campaign and sets a priority for the two different channels of inbound communication. In this instance, the administrator indicates the inbound calls has a higher priority than the inbound SMS text messages. Therefore, the roster template module initially generates a roster template based on the forecast for the inbound calls that includes a morning shift and an afternoon shift for each day the campaign is to be run and identifies the number of agents to schedule to work during each shift.

Depending on the embodiment, the roster template module may utilize one or more methods and/or calculations to determine the initial number of agents to schedule to work based on the forecast. For instance, in this particular embodiment, the roster template module determines the number of agents to schedule for each shift based on the determined maximum number of agents needed for a time interval plus the determined minimum number of agents needed for a time interval (excluding intervals that need 0 agents) divided by 2 for the time intervals that occur during the shift when agents from the other shift are not scheduled. Therefore, the initial number of agents to schedule for the morning shift is 13 1030+1 1035=14/2=7. While the initial number of agents to schedule for the afternoon shift is 19 1040+1 1045=20/2=10.

Turning to FIG. 11, a table is provided showing a surplus or deficiency of allocated resources for each time interval for handling the expected inbound calls based on scheduling seven agents for the morning shift and ten agents for the afternoon shift. Accordingly, seventeen agents are scheduled to work from 1:00 p.m. to 5:00 p.m. since the two shifts overlap during this time. In this instance, deficiencies exists during the 9:45 a.m. (−6 1110), 11:45 a.m. (−6 1115), 12:00 p.m. (−1 1120), 3:30 p.m. (−2 1125), 5:45 p.m. (−9 1130), 7:30 p.m. (−6 1135), and 7:45 p.m. (−5 1140) time intervals because the number of agents scheduled to work do not meet the number of agents needed to handle the number of calls forecasted to be received during these time intervals. The deficiencies represent the number of agents understaffed for the particular time interval. For example, the deficiency of −6 1110 during the 9:45 p.m. time interval indicates that six additional agents would need to be staffed to handle the number of inbound calls forecasted to be received during this time interval.

In this example, the contact center has established parameters that are used by the roster template module to determine whether or not to address a deficiency. The first parameter states that an occurrence in which any two consecutive time intervals having deficiencies with a sum greater than ten should be addressed. This particular parameter has been put in place by the contact center to ensure that communications placed in a waiting queue are not held in the queue for an extended period of time before being connected with an agent. Looking at the deficiencies in FIG. 11, there is one occurrence in which the deficiencies in consecutive time intervals sum to more than ten, that being the deficiencies for the time intervals 7:30 p.m. (−6 1135) and 7:45 p.m. (−5 1140) add up to eleven.

The contact center has also defined another parameter that states that any deficiencies to be addressed based on the first parameter can be ignored if the following two time intervals have surpluses with a sum greater than ten. The logic behind this parameter is that if a large number of communications must be placed in a waiting queue due to deficiencies and the following time intervals have a large surplus of agents, then the communications placed in the queue will still be handled in a timely manner without having to add agents. Accordingly, the roster template module determines the two time intervals (8:00 p.m. having a surplus of nine 1145 and 8:15 p.m. having a surplus of ten 1150) following the occurrence of deficiencies meeting the first parameter have surpluses that sum to nineteen agents and therefore the occurrence of deficiencies for the time intervals 7:30 p.m. and 7:45 p.m. does not need to be addressed.

At this point, the roster template module determines the roster template meets all of the parameters defined for the contact center with respect to the inbound calls expected to be received for the campaign. Next, the roster template module determines whether the roster template meets the parameters with respect to the inbound SMS text messages. Turning to FIG. 12, a table is provided showing a surplus or deficiency for each time interval for handling the expected inbound SMS text messages based on scheduling seven agents for the morning shift and ten agents for the afternoon shift. As one can see, two consecutive deficiencies 1210, 1215 occur for the 11:15 a.m. and 11:30 a.m. time intervals sum to greater than ten. In addition, the two time intervals following these two consecutive deficiencies 1210, 1215 do not have surpluses 1220, 1225 that sum to greater than ten. Therefore based on the previously defined parameters, the roster template module determines this occurrence of deficiencies should be addressed.

In this particular embodiment, the roster template module initially attempts to address the occurrence of deficiencies by moving agents from the afternoon shift to the morning shift. Specifically, the roster template module attempts to provide one additional agent to the morning shift to lower the deficiencies 1210, 1215 enough for the two consecutive time intervals so that their sum is lower than ten. Accordingly, the roster template lowers the number of agents scheduled for the afternoon shift from ten agents to nine agents and raises the number of agents scheduled for the morning shift from seven agents to eight agents. The results of making such a change is shown in FIGS. 13 and 14.

Turning first to FIG. 13, this figure provides a table showing the surpluses and deficiencies created by moving the agent from the afternoon shift to the morning shift with respect to the inbound calls. As one can see, the two consecutive deficiencies 1310, 1315 for time intervals 7:30 p.m. and 7:45 p.m. have increased due to moving an agent from the afternoon shift to the morning shift. However, the roster template still adheres to all of the parameters defined for the contact center with respect to the inbound calls because the sum of surpluses 1320, 1325 for the following two time intervals is still greater than ten.

In turn, FIG. 14 provides a table showing the surpluses and deficiencies created by moving the agent from the afternoon shift to the morning shift with respect to the inbound SMS text messages to generate a roster template with eight agents scheduled for the morning shift and nine agents scheduled for the afternoon shift. Now the roster template adheres to the parameters defined by the contact center with respect to the inbound SMS text messages. As shown, the sum of the two consecutive deficiencies 1410, 1415 that were a problem with only seven agents scheduled for the morning shift has been reduced to less than ten.

At this point, the same process is carried out for each of the remaining days the campaign is to be conducted. Once the roster template module has completed generating the roster template for the campaign and the administrator finds the roster template acceptable, the administrator may then use the schedule module to apply the roster template and generate a schedule to conduct the campaign. Generally speaking, the schedule module uses the roster template and applies the contact center's staff in accordance with the template to schedule staff members to work the morning and afternoon shifts for the campaign.

Second Example to Demonstrate Functionality of Various Embodiments

A second example is now provided to further help demonstrate the functionality of various embodiments of the invention. Again, those of ordinary skill in the art should understand that this example is provided for demonstration purposes only and should not be construed to limit the scope of various embodiments of the invention.

Again in this example, a contact center has been contracted to conduct a campaign that involves sending outbound SMS text messages to individuals advertising a company's products and providing each individual with the option of placing an inbound call or reply SMS text message to request additional information on the company's products. However, in this instance, the contact center plans to send out a total of 30,000 SMS text messages. Accordingly, an administrator at the contact center creates the campaign via the campaign module and generates a forecast for the campaign using the forecast module.

FIG. 15 provides a table representation of the results for a day showing the forecasted communications for the campaign. In this example, the contact center plans to send 3,000 outbound SMS text messages at 9:00 a.m. 1510 and 7:00 p.m. 1515, 5,000 outbound SMS text messages at 11:00 a.m. 1520 and 5:00 p.m. 1525, and 7,000 outbound SMS text messages at 1:00 p.m. 1530 and 3:00 p.m. 1535. Similar to the first example, the time intervals have been set for every fifteen minutes.

Figure 16:
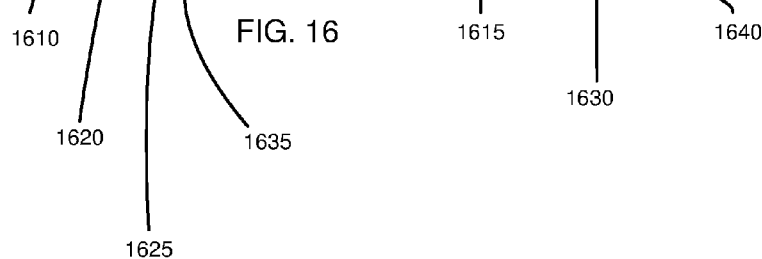

Turning now to FIG. 16, the table in this figure provides the number of agents needed to handle the forecasted number of communications received during each time interval for each channel of communication. Again, the duration is nine-hundred seconds for each time interval since a time interval is fifteen minutes and the AHT for an inbound call is two-hundred and fifty-seven seconds for an inbound call and one-hundred and twenty-one seconds for an inbound SMS text message. Therefore, for the 11:45 a.m. time interval, the campaign requires twenty-seven agents 1610 to handle the ninety-three inbound calls and twelve agent 1615 to handle the eighty-nine inbound SMS text messages predicted by the forecast to be received during this time interval. Again, agents at the contact center can generally handle a call and a SMS text message at virtually the same time.

At this point, the administrator invokes the roster template module and selects the campaign and sets a priority for the two channels of inbound communications. Like in the first example, the administrator indicates the inbound calls have the priority over the inbound SMS text messages. Accordingly, the roster template module initially generates a roster template based on the forecast for the inbound calls that includes a morning shift and an afternoon shift for each day the campaign is to be run and identifies the number of agents to schedule to work during each shift. Therefore, in this example, the roster template module determines the initial number of agents to schedule for the morning shift based on the average of the top three forecasted maximum number of agents needed for a time interval divided by two. Accordingly, the morning shift is 40 1620+35 1625+32 1630=107/3=35/2=18 agents. While the roster template module determines the initial number of agents to schedule for the afternoon shift based on the highest number of agents required for an interval in which agents from the morning shift are not scheduled plus the lowest number of agents required for an interval in which agents from the morning shift are not scheduled divided by two. Therefore, in the example, the initial number of agents to schedule for the afternoon shift is 38 1635+1 1640=39/2=20 agents.

Turning now to FIG. 17, a table is provided showing a surplus or deficiency of allocated resources for each time interval for handling the inbound calls based on scheduling eighteen agents for the morning shift and twenty agents for the afternoon shift. As you may recall from the first example, the contact center has established a parameter that states an occurrence of any two consecutive time intervals with deficiencies that sun to greater than ten should be addressed. In this instance, the 5:45 p.m. time interval (−18 1710), by itself, has a deficiency greater than ten. However, the following two time intervals have a surplus 1715, 1720 that sum to greater than ten. Therefore, the roster template module determines this occurrence of deficiency still meets and the parameters and does not need to be addressed. Accordingly, the roster template meets the parameters with respect to handling the inbound calls predicted to be received during this campaign on the given day.

The roster template module then turns to the inbound SMS text messages predicted to be received for the campaign. Thus, FIG. 18 provides a table showing a surplus or deficiency of allocated resources for each time interval for handling the inbound SMS text messages based on scheduling eighteen agents for the morning shift and twenty agents for the afternoon shift. In this instance, three different deficiencies 1810, 1815, 1820 exist that have a sum greater than ten. The roster template module determines the first of these deficiencies 1820 at the 11:15 a.m. time interval should be addressed because the two consecutive time intervals following this time interval do not have surpluses that sum to greater than ten. In this particular example, the contact center is able to schedule up to twenty-five agents for any given turn on a day. Therefore, since the current roster template only has a total of eighteen agents scheduled to work the morning shift, the roster template module can address the deficiency by adding seven more agents to the roster template for the morning shift. The results of making such an addition is shown in FIG. 19. Here, one can see that the deficiency 1910 for the 11:15 a.m. time interval still sums to greater than ten. However, now the two consecutive time intervals after this interval have surpluses 1915, 1920 that sum to greater than ten. Therefore, the deficiency 1910 has been adequately addressed.

Returning to FIG. 18, the roster template module then determines whether the other two deficiencies 1810, 1815 should be addressed. In both instances, the two consecutive time intervals following these two deficiencies 1810, 1815 have surpluses that sum to greater than ten. Therefore, the roster template module would normally determine these two deficiencies 1810, 1815 do not need to be addressed. However, in this instance, the contact center has defined an additional parameter stating that any deficiency greater than twenty-five must be address regardless of whether the two consecutive time intervals following the deficiency have surpluses that sum to greater than ten. Therefore, the roster template module determines the two deficiencies 1810, 1815 should be addressed.

Here, the roster template module could attempt to address the deficiencies 1810, 1815 by scheduling five additional agents for the afternoon shift since the current roster template only has twenty agents scheduled for the afternoon shift and the contact center is allowed to schedule a maximum of twenty-five agents for any given shift on a day. However, scheduling five additional agents for the afternoon shift will not reduce the deficiencies 1810, 1815 to an acceptable level to meet the parameter. Therefore, the roster template module needs to make a further adjustment to the template to address these deficiencies 1810, 1815.

Thus, in various embodiments, the roster template module is configured to addresses the deficiencies 1810, 1815 by adjusting the number of outbound SMS text messages sent at the 1:00 p.m. and 3:00 p.m. time intervals to affect the number of SMS text messages received during the 1:15 p.m. and 3:15 p.m. time intervals so that fewer agents are needed during these time intervals. Accordingly, the roster template module determines based on the surplus and deficiency of allocated resources for each time interval for handling the inbound SMS text messages that the outbound SMS text messages should be adjusted to now send 4,000 SMS text messages 2010 at 9:00 a.m. and 6,000 SMS text messages 2015 at 5:00 p.m., while reducing the number of SMS text messages sent at 1:00 p.m. and 3:00 p.m. to 6,000 2020, 2025 as shown in FIG. 20. In this particular instance, the roster template module determines this adjustment based on the fact that the time intervals in which the inbound SMS text messages are mainly received from the outbound SMS text messages sent at 9:00 a.m. and 5:00 p.m. have a surplus of agents.

Therefore, turning to FIG. 21, a table is provided showing a surplus or deficiency of allocated resources for each time interval for handling the inbound SMS text messages based on scheduling twenty-five agents for the morning shift and twenty agents for the afternoon shift while adjusting the number of outbound SMS text messages as noted above. Accordingly, the deficiencies 2110, 2115 for time intervals 1:15 p.m. and 3:15 p.m. have been decreased to below twenty-five. Therefore, the roster template now adheres to all of the parameters defined by the contact center for handling the inbound SMS text messages predicted to be received on the given day for the campaign.

Finally, the roster template module determines whether the change made with respect to sending the outbound SMS text messages has affected the roster template's ability to handle the predicted inbound calls to the point that the template no longer adheres to the parameters defined by the contact center. Looking at FIG. 22, a table is provided showing a surplus or deficiency of allocated resources for each time interval for handling the inbound calls based on scheduling twenty-five agents for the morning shift and twenty agents for the afternoon shift while adjusting the number of outbound SMS text messages as noted above. In this instance, the time interval of 5:45 p.m. has a deficiency of twenty-four 2210. However, the following two consecutive time intervals have surpluses that sum to greater than ten. Therefore, in this example, the roster template module determines the roster template meets the requirements established by the parameters for the campaign. At this point, the same process is carried out for each of the remaining days to be conducted for the campaign. Once the roster template module has completed generating the roster template for the campaign and the administrator finds the roster template acceptable, the administrator may then use the schedule module to apply the roster template and generate a schedule to conduct the campaign. Generally speaking, the schedule module uses the roster template and applies the contact center's staff in accordance with the template to schedule staff members to work the morning and afternoon shifts for the campaign.

Campaign Monitoring Module

Once a schedule has been generated, the contact center generally conducts the campaign involving sending outbound communications to generate inbound communications using one or more channels of communication according to the schedule. That is to say, the contact center has the agents who are scheduled to work for each particular workday according to the schedule work their corresponding turns on their scheduled workdays and handle the inbound communications for the campaign.

Figure 23:
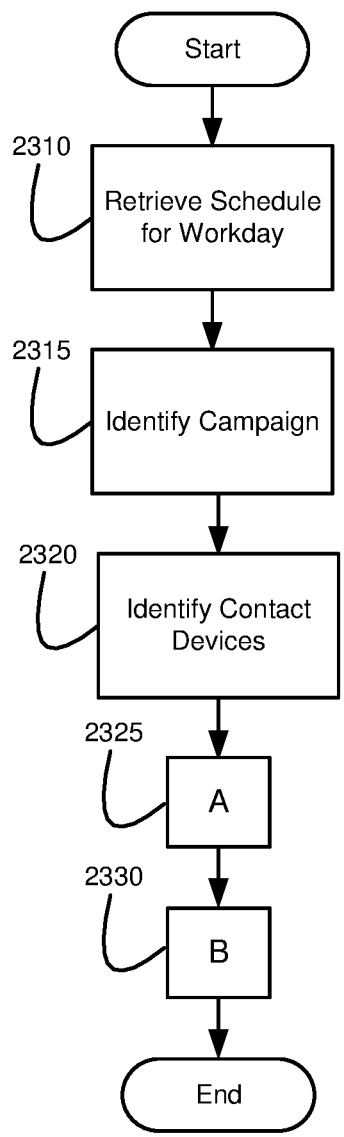
FIG. 23 is a flowchart illustrating a campaign monitoring module that can be used in accordance with various embodiments of the present invention.

FIG. 23 provides additional details regarding a process flow for monitoring the campaign on a given workday. In particular, FIG. 23 is a flow diagram showing a campaign monitoring module for performing such functionality according to one embodiment of the invention. For example, the flow diagram shown in FIG. 23 may correspond to operations carried out by a processor in a system, such as the CM 150 for example, as it executes the campaign monitoring module stored in the system's volatile and/or nonvolatile memory. In general, the campaign monitoring module invokes other modules to provide functionality in relation to monitoring the campaign as it is being conducted at the contact center for the given day. Further details with respect to two of the modules are provided in the discussion below and FIGS. 24-25.

Turning now to FIG. 23, the process begins with the campaign monitoring module retrieving the schedule for the workday in Operation 2310. Accordingly, the schedule may be stored in some type of media from which the campaign monitoring module reads the schedule and identifies the campaign involved from the schedule in Operation 2315. Thus, in particular embodiments, the schedule may identify information in addition to shifts and agents scheduled to work the shifts such as, for example, the campaign being conducted during the shifts and/or the contact devices 131 involved in handling communications for the campaign. Therefore, in Operation 2320, the campaign monitoring module identifies the contact devices 131 involved in conducting the campaign.

At this point, the campaign monitoring module invokes the agent monitoring module for monitoring the status of agents working during the workday, shown as Operation 2325. As explained in further detail below, the agent monitoring module identifies the agents scheduled to work during the workday and verifies the agents are logged in at the appropriate times and available to handle communications for the campaign being conducted. Likewise, the campaign monitoring module invokes the communication monitoring module for determining what agents to route communications to for the campaign, shown as Operation 2330. As explained in further detail below, the communication monitoring module receives a message about a particular communication received by the contact center and determines what agent should handle the communication. It should be noted that depending on the embodiment, the campaign monitoring module may provide information to the agent monitoring module and/or the communication monitoring module. For instance, in particular embodiments, the campaign monitoring module provides the modules with information from the schedule for the campaign being conducted. In turn, this information can be used, for instance, by the agent monitoring module to determine which agents should be logged in and available according to the schedule. Once the campaign monitoring module has invoked the agent monitoring and communication monitoring modules, the process ends for the particular embodiment shown in FIG. 32.

Agent Monitoring Module

Figure 24:
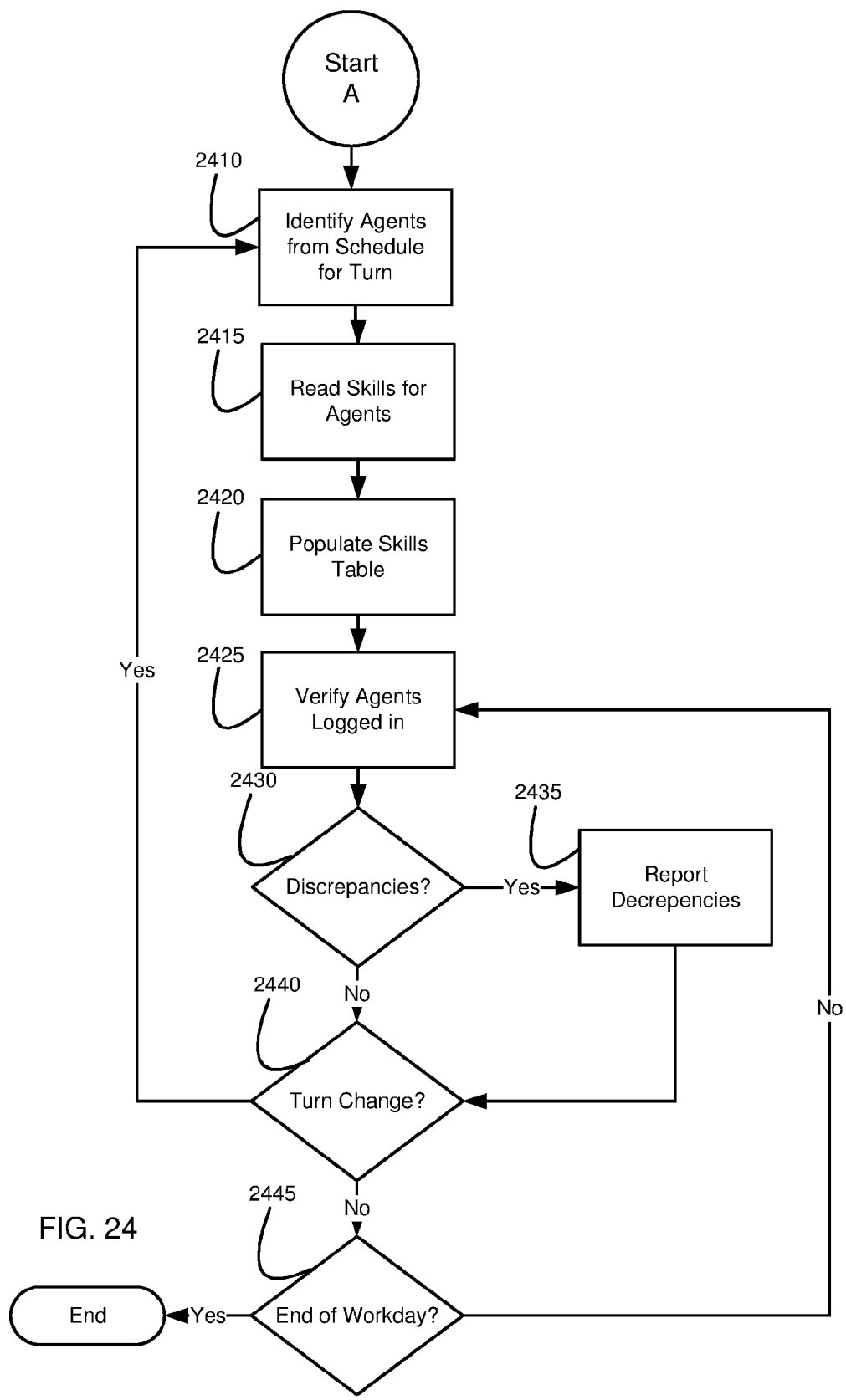
FIG. 24 is a flowchart illustrating an agent monitoring module that can be used in accordance with various embodiments of the present invention.

Turning now to FIG. 24, additional details are provided regarding a process flow for identifying and verifying what agents are logged in and available for handling communications for the campaign. In particular, FIG. 24 is a flow diagram showing an agent monitoring module for performing such functionality according to one embodiment of the invention. As mentioned above, in various embodiments, the agent monitoring module may be invoked by the campaign monitoring module described above. However, it should be understood that in other embodiments, the agent monitoring module may be a stand-alone computer program module. Thus, the flow diagram shown in FIG. 24 may correspond to operations carried out by a processor in a system, such as the CM 150 for example, as it executes the agent monitoring module stored in the system's volatile and/or nonvolatile memory.

Therefore, beginning with Operation 2410, the agent monitoring module identifies the agents from the schedule that should be working for the current turn. Depending on the embodiment, the agent monitoring module may obtain information on what agents are scheduled to be working for the current turn from different sources such as storage media or from some other module such as the campaign monitoring module for example. At this point, the agent monitoring module reads the skills associated with each agent scheduled to work the turn in Operation 2415. Again, depending on the embodiment, information on the skills may be obtained from different sources. For example, in one embodiment, the agent monitoring module may be configured to access such information from a data store 175 within the contact center architecture 100. Further, depending on the embodiment, the information on the skills may include various types of information such as, for example, the subject matters an agent is trained to handle, the languages the agent can speak and/or write, and the combinations of channels the agent can handle at virtually the same time. Once the agent monitoring module reads these skills, the module populates a skills table with the skills in Operation 2420.

Depending on the embodiment, the skills table may be one of many different types of data structures to store information such as, for example, a file, a database, a table in a database, etc. Such information is stored in the skills table for the embodiment of the agent monitoring module shown in FIG. 24 to help centralize skills information for the agents scheduled to work the current turn. Centralization of such information helps in providing faster access to this information when needed. For example, as is explained in further detail below, the communication monitoring module accesses this information in various embodiments when determining which agent should handle a particular communication. By having the skills information centralized for the agents scheduled to being working, the communication monitoring module can access the appropriate skills information for a particular agent more quickly than had the communication monitoring module had to access this information from a location (e.g., one or more data structures) containing skills information for all of the agents employed by the contact center, regardless of whether the agents are currently working or not. However with that said, in other embodiments, centralization of the skill information is not necessarily required for faster processing and the agent monitoring module may not perform this operation.

At this point, the agent monitoring module verifies which agents are logged in and currently available to handle communications for the campaign in Operation 2425. In particular embodiments, the agent monitoring module carries out this operation by comparing the agents scheduled to work the current turn with the agents that are actively logged in and available to handle communications. For instance, in one embodiment, the agent monitoring module may gather information on which agents are actively logged in and available from the various contact devices 131 being used to conduct the campaign. Accordingly, the agent monitoring module receives this information and compares the information with the scheduled information to determine whether the agents scheduled to work the current turn are in fact actively logged in and available. That is to say, the agent monitoring module determines whether any discrepancies exits with respect to the agents scheduled to work the current turn and the agents actively logged in and available in Operation 2430.

If any discrepancies exist, the agent monitoring module reports such discrepancies in Operation 2435. For instance, in one embodiment, the agent monitoring module reports such discrepancies to a contact center administrator in some form such as, for example, an email or IM message. At this point, the agent monitoring module determines whether a turn change has occurred for the workday in Operation 2440. A turn change is typically when either a current turn ends or a new turn begins. Accordingly, the agents who are actively logged in and available typically change as a result of such a change. That is to say, agents who are currently working may be ending their turn and quitting work. While other agents who are scheduled to work may be starting their turn and beginning work. If so, then the agent monitoring module returns to operation 2410 and identifies the agents who are scheduled to work the current turn.

With that said, it should be understood that just because a new turn is beginning does not necessarily mean a current turn is ending and vice versa. As you may recall, in the example provided above, the contact center operated a morning turn that ran from 9:00 a.m. to 5:00 p.m. and an afternoon turn that ran from 1:00 p.m. to 9:00 p.m. for a workday. Accordingly, in this instance, portions of the two turns overlapped each other. Therefore, the operation involving the agent monitoring module identifying the agents from the schedule for the current turn may involve identifying agents for multiple turns.

Finally, if a turn change has not occurred, then the agent monitoring module determines whether the workday has ended in Operation 2445. Again, the agent monitoring module makes such a determination based on the schedule information in various embodiments. If the workday has ended, then the process ends for the agent monitoring module. However, if the workday has not ended, then the agent monitoring module returns to Operation 2425 and verifies what agents are currently logged in and available.

Communication Monitoring Module

Figure 25:
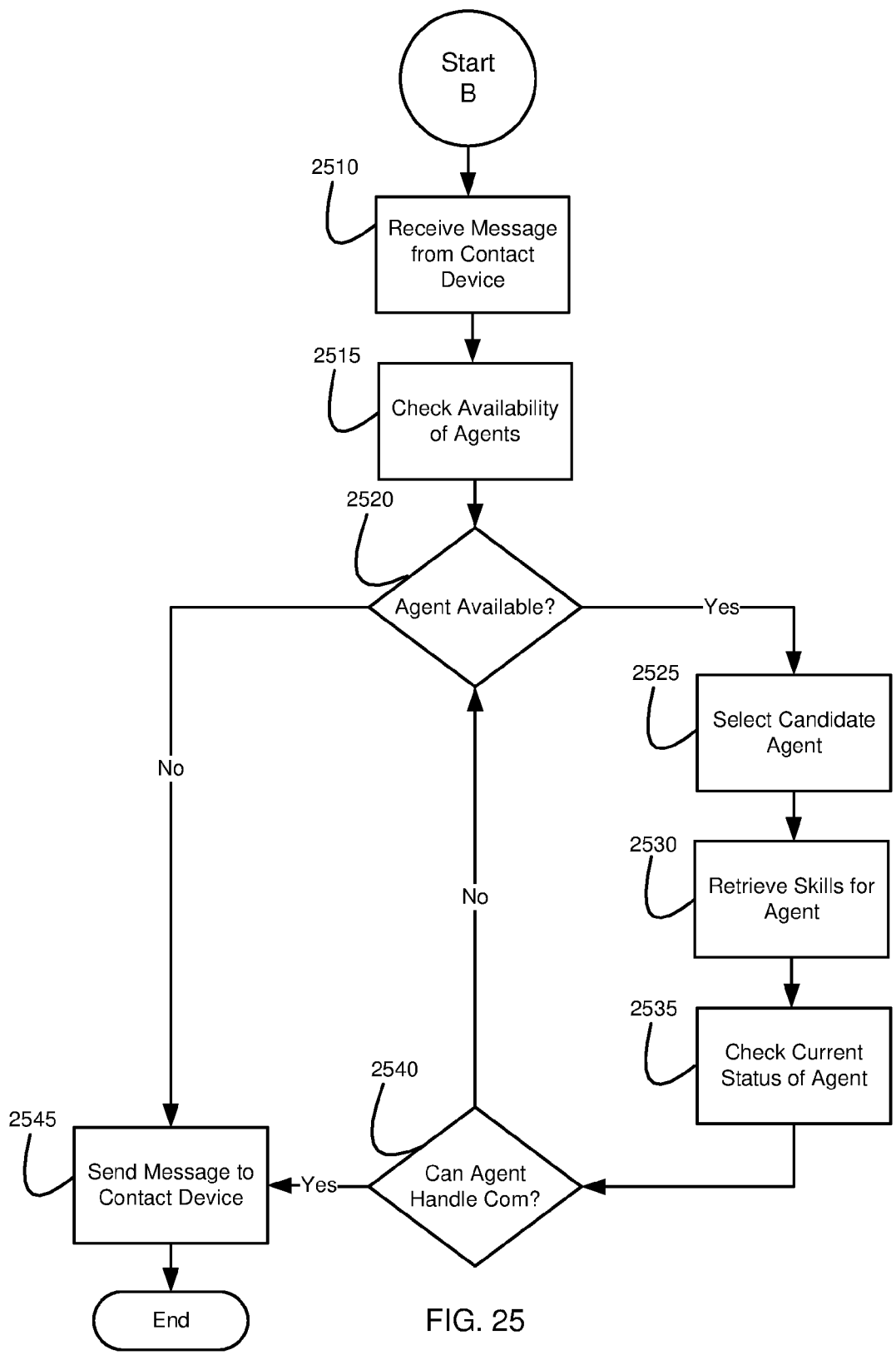
FIG. 25 is a flowchart illustrating a communication monitoring module that can be used in accordance with various embodiments of the present invention.

Turning now to FIG. 25, additional details are provided regarding a process flow for selecting a particular agent for handling an inbound communication for one of the channels of communication being used for the campaign. In particular, FIG. 25 is a flow diagram showing a communication monitoring module for performing such functionality according to one embodiment of the invention. As mentioned above, in various embodiments, the communication monitoring module may be invoked by the campaign monitoring module described above. In addition, depending on the embodiment, the communication monitoring module may be provided with information from the campaign monitoring module such as, for example, what campaign is currently being conducted, the contact devices 131 handling communications for the campaign, and/or the channels of communication being used for the campaign. However, it should be understood that in other embodiments, the communication monitoring module may be a stand-alone computer program module. Thus, the flow diagram shown in FIG. 25 may correspond to operations carried out by a processor in a system, such as the CM 150 for example, as it executes the communication monitoring module stored in the system's volatile and/or nonvolatile memory.

Therefore, beginning with Operation 2510, the communication monitoring module receives a message from a contact device 131 about a communication received by the contact center. For instance, returning to the example in which the contact center is conducting a campaign involving sending outbound communications to generate inbound communications using one or more channels of communication, the message identifies a communication received for the campaign. In turn, the communication monitoring module checks the availability of various agents in Operation 2515. For instance, in one embodiment, the communication monitoring module may query the contact device 131 that sent the message to inquire about the current agents assigned to handle communications for the contact device 131. While in other embodiments, the communication monitoring module may maintain a current status for each agent. Accordingly, the contact device 131 provides information on what agents are currently available to the communication monitoring module.

At this point, the communication monitoring module determines whether any agents are available in Operation 2520. If not, then the communication monitoring module sends the contact device 131 a message on how to handle the communication in Operation 2545. For instance, the communication monitoring module may inform the contact device 131 to place the communication in a hold queue or to maintain the communication in a hold queue. While in another instance, the communication monitoring module may inform the contact device 131 to forward the communication to a component that provides a form of automated service for the communication. Those of ordinary skill in the art can envision several options the communication monitoring module may provide to the contact device 131 in light of this disclosure.

If, however, at least one agent is available, the communication monitoring module selects a candidate agent in Operation 2525. Depending on the embodiment, the communication monitoring module may select the candidate agent based on different criteria. For instance, in one embodiment, the communication monitoring module may select the candidate agent based on which agent has been available for the longest amount of time. While in another embodiment, the communication monitoring module may select the candidate agent based on the agent being in some group of agents that has a particular skill relative to the communication such as being able to speak and/or write in Spanish. While yet in another embodiment, the communication monitoring module may select the candidate agent based on an agent's average handle time ("AHT") with respect to the channel of communication being used for the communication involved in the received message. Again, those of ordinary skill in the art can envision several different criteria the communication monitoring module may use to select a candidate agent in light of this disclosure.

Continuing on, the communication monitoring module retrieves skills for the selected agent from the skills table populated by the agent monitoring module in Operation 2530. Specifically, in particular embodiments, the communication monitoring module retrieves skills on what specific channels of communication the selected agent can handle and what combinations of channels of communication the selected agent can handle. For instance, returning to the example, the campaign being conducted may involving receiving inbound calls and SMS text messages, and the message received by the communication monitoring module may involve a communication for any one of these two channels of communication. Accordingly, the communication monitoring module retrieves the channels of communication and the combination of these channels the selected agent can handle. For example, the selected agent may be able to handle an inbound call while also handling an inbound SMS text message. In addition, the selected agent may be able to handle two inbound Web chats, two inbound SMS text messages, or an inbound Web chat and an inbound SMS text message as the same time.

At this point, the communication monitoring module checks the current status of the selected agent in Operation 2535. Thus, in particular embodiments, the communication monitoring module queries each of the contact devices 131 to inquire the current status of the selected agent with respect to the particular contact device 131. For instance, returning to the example, the communication monitoring module queries the contact device 131 handling the inbound calls for the campaign and the contact device 131 handling the inbound SMS text messages for the campaign. Accordingly, the contact device 131 handling the inbound calls replies that the selected agent is currently handling an inbound call for the campaign. While, the contact device 131 handling the inbound SMS text messages replies that the selected agent is currently available and not handling any SMS text messages for the campaign.

Therefore, the communication monitoring module determines whether the agent can handle the communication associated with the received message in Operation 2540. Thus in the example, the communication associated with the received message is an inbound call and the selected agent is currently handling an inbound call. Therefore in this instance, the communication monitoring module determines the agent cannot handle the communication associated with the received message. As a result, the communication monitoring module returns to Operation 2520 to determine whether another agent is available. If so, then the communication monitoring module repeats Operations 2530 and 2535 for this selected agent.

This time the selected agent has the same skills as the previously selected agent and is currently only handling an inbound SMS text message. Therefore, the communication monitoring module determines in Operation 2540 that the agent can handle the communication (e.g., the inbound call) associated with the received message since the selected agent is able to handle an inbound call and inbound SMS text message at the same time. Accordingly, the communication monitoring module sends a message to the contact device 131 advising the contact device 131 to forward the inbound call to the selected agent to handle in Operation 2545. At this point the process ends.

Exemplary Processing Device Architecture

Figure 26:
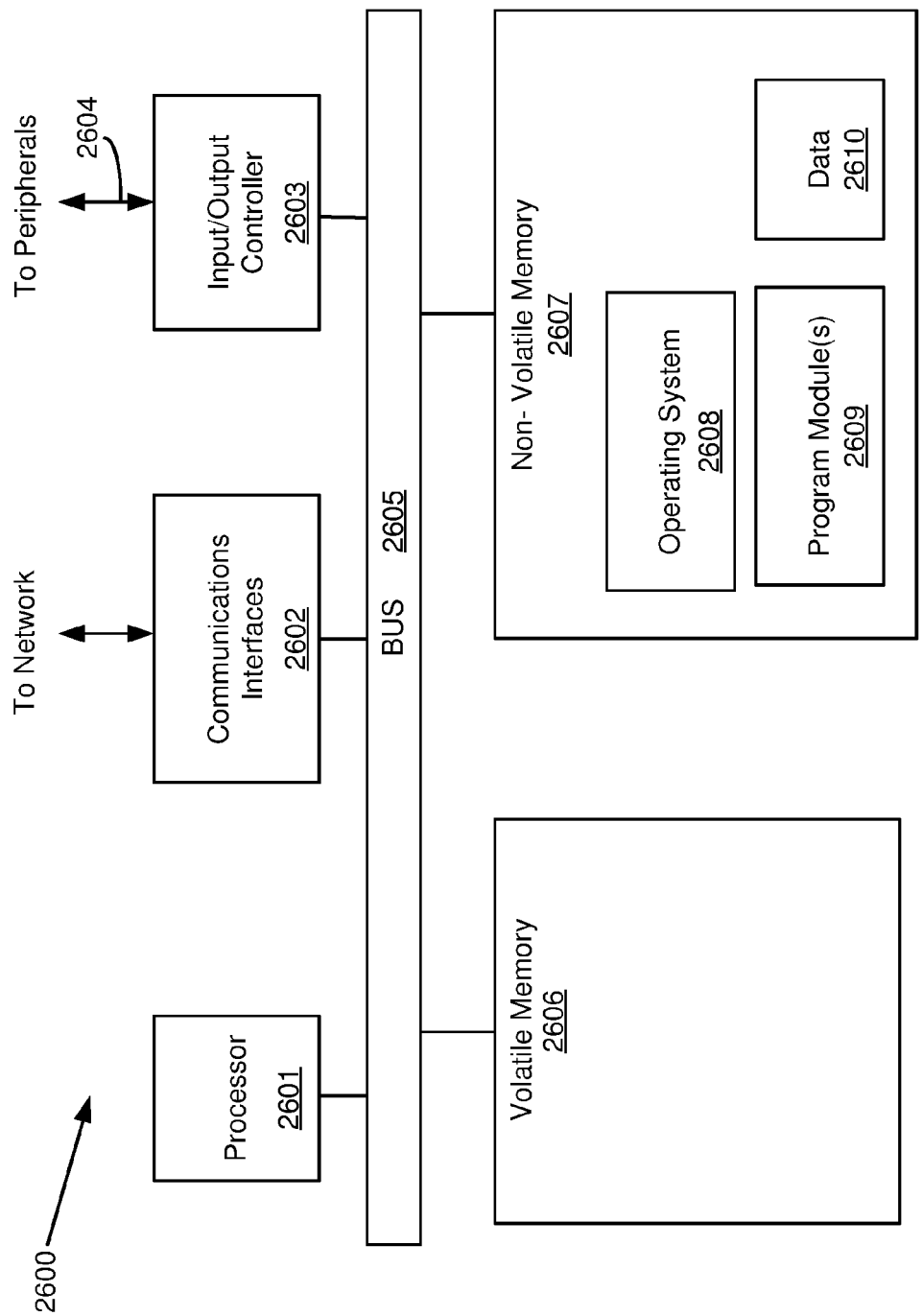
FIG. 26 is an exemplary schematic diagram of a server used in one embodiment of the contact center architecture to practice the technologies disclosed herein.

As discussed in conjunction with FIG. 1, the contact center architecture 100 may comprise various components that comprise a processing system. FIG. 26 is an exemplary schematic diagram of a processing system 2600 that may be used in an embodiment of the contact center architecture 100 to practice the technologies disclosed herein such as, for example, the contact device(s) 131, IVR 130, ITR 140, CM 150, WFM 155, or other component previously described. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 26, the processing system 2600 may include one or more processors 2601 that may communicate with other elements within the processing system 2600 via a bus 2605. The processor 2601 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 2600 may also include one or more communications interfaces 2602 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 2603 may also communicate with one or more input devices or peripherals using an interface 2604, such as, but not limited to: a keyboard, a mouse, a touch screen/display input, microphone, pointing device, etc. The input/output controller 2603 may also communicate with output devices or peripherals, such as displays, printers, speakers, headsets, banner displays, etc.

The processor 2601 may be configured to execute instructions stored in volatile memory 2606, non-volatile memory 2607, or other forms of computer-readable storage media accessible to the processor 2601. The volatile memory 2606 may comprise various types of memory technologies, including, but not limited to: random access memory ("RAM"), dynamic random access memory ("DRAM"), static random access memory ("SRAM"), and other forms well known to those skilled in the art. The non-volatile memory 2607 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 2607 may store program code and data, which also may be loaded into the volatile memory 2606 at execution time. Specifically, the non-volatile memory 1807 may store one or more program modules 2609, such as those described above containing instructions for performing the processes and/or functions associated with the technologies disclosed herein, and/or operating system code 2608. In addition, these program modules 2609 may also access, generate, or store data 2610, such as the aforementioned records and data, in the non-volatile memory 2607, as well as in the volatile memory 2606. The volatile memory 2606 and/or non-volatile memory 2607 may be used to store other information including, but not limited to: records, applications, programs, scripts, source code, object code, byte code, compiled code, interpreted code, machine code, executable instructions, or the like. These may be executed or processed by, for example, the processor 2601 and/or may form a part of, or may interact with, the program modules 2609.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for generating a template for use in scheduling resources for a contact center to conduct a campaign, the method comprising:

generating by a workforce management system a forecast based on a set of campaign parameters and a historical dataset, the set of campaign parameters comprising (1) a first channel of communication to be used to send outbound communications and (2) a second channel of communication to be used to receive inbound communications generated as a result of sending the outbound communications, the historical dataset comprising historical outbound communications sent using the first channel of communication that generated historical inbound communications received using the second channel of communication, and the forecast identifying at least one of (1) a number of inbound communications expected to be received using the second channel of communication during the campaign and (2) a number of outbound communications needed to be sent during the campaign using the first channel of communication to generate a target number of inbound communications to receive using the second channel of communication;

identifying by the workforce management system a number of resources needed to handle at least one of (1) the number of inbound communications expected to be received during the campaign and (2) the number of outbound communications needed to be sent during the campaign; and generating the template by the workforce management system, the template comprising one or more shifts identifying resources to schedule based on the number of resources needed to handle at least one of (1) the number of inbound communications expected to be received during the campaign and (2) the number of outbound communications needed to be sent during the campaign.

2. The method of claim 1, wherein the resources to schedule comprise at least one of agents and communication trunks.

3. The method of claim 1, wherein the first channel of communication comprises one of a text message, an email, and a direct mail and the second channel of communication comprises one of a telephone call, a text message, an email, and a direct mail.

4. The method of claim 1 further comprising generating a schedule by the workforce management system based on the template, the schedule identifying actual resources scheduled to be used during the campaign.

5. The method of claim 4 further comprising:
identifying the actual resources from the schedule by a campaign monitoring system; and
verifying resources currently being used to handle at least one of outbound and inbound communications for the campaign by the campaign monitoring system based on the actual resources identified from the schedule to identify any discrepancies between the resources currently being used to handle at least one of the outbound and inbound communications for the campaign and the actual resources identified from the schedule.

6. The method of claim 5 further comprising:
receiving a message from a contact device about an outbound communication to send for the campaign or an inbound communication received for the campaign by the campaign monitoring system;

selecting a particular resource from the resources currently being used to handle at least one of outbound and inbound communications for the campaign by the campaign monitoring system; and sending a message to the contact device advising the contact device to send the outbound communication using the particular resource or to transfer the inbound communication to the particular resource.

7. A non-transitory, computer-readable medium comprising computer-executable instructions for generating a roster template for use in scheduling agent resources for a contact center to conduct a campaign that when executed cause at least one computer processor to:

generate a forecast based on a set of campaign parameters and a historical dataset, the set of campaign parameters comprising (1) a first channel of communication to be used to send outbound communications and (2) a second channel of communication to be used to receive inbound communications generated as a result of sending the outbound communications, the historical dataset comprising historical outbound communications sent using the first channel of communication that generated historical inbound communications received using the second channel of communication, and the forecast identifying at least one of (1) a number of inbound communications expected to be received using the second channel of communication during the campaign and (2) a number of outbound communications needed to be sent during the campaign using the first channel of communication to generate a target number of inbound communications to receive using the second channel of communication;

identify a number of resources needed to handle at least one of (1) the number of inbound communications expected to be received during the campaign and (2) the number of outbound communications needed to be sent during the campaign; and generate the template comprising one or more shifts identifying resources to schedule based on the number of resources needed to handle at least one of (1) the number of inbound communications expected to be received during the campaign and (2) the number of outbound communications needed to be sent during the campaign.

8. The non-transitory, computer-readable medium of claim 7, wherein the resources to schedule comprise at least one of agents and communication trunks.

9. The non-transitory, computer-readable medium of claim 7, wherein the first channel of communication comprises one of a text message, an email, and a direct mail and the second channel of communication comprises one of a telephone call, a text message, an email, and a direct mail.

10. The non-transitory, computer-readable medium of claim 7, wherein the computer-executable instructions when executed further cause the at least one computer processor to generate a schedule based on the template, the schedule identifying actual resources scheduled to be used during the campaign.

11. The non-transitory, computer-readable medium of claim 10, wherein the computer-executable instructions when executed further cause the at least one computer processor to:

identify the actual resources from the schedule; and
verify resources currently being used to handle at least one of outbound and inbound communications for the campaign based on the actual resources identified from the schedule to identify any discrepancies between the resources currently being used to handle at least one of the outbound and inbound communications for the campaign and the actual resources identified from the schedule.

12. The non-transitory, computer-readable medium of claim 11, wherein the computer-executable instructions when executed further cause the at least one computer processor to:

receive a message from a contact device about an outbound communication to send for the campaign or an inbound communication received for the campaign;

select a particular resource from the resources currently being used to handle at least one of outbound and inbound communications for the campaign; and send a message to the contact device advising the contact device to send the outbound communication using the particular resource or to transfer the inbound communication to the particular resource.

13. A system for generating a roster template for use in scheduling agent resources for a contact center to conduct a campaign comprising:

a workforce management component configured to:
generate a forecast based on a set of campaign parameters and a historical dataset, the set of campaign parameters comprising (1) a first channel of communication to be used to send outbound communications and (2) a second channel of communication to be used to receive inbound communications generated as a result of sending the outbound communications, the historical dataset comprising historical outbound communications sent using the first channel of communication that generated historical inbound communications received using the second channel of communication, and the forecast identifying at least one of (1) a number of inbound communications expected to be received using the second channel of communication during the campaign and (2) a number of outbound communications needed to be sent during the campaign using the first channel of communication to generate a target number of inbound communications to receive using the second channel of communication;

identify a number of resources needed to handle at least one of (1) the number of inbound communications expected to be received during the campaign and (2) the number of outbound communications needed to be sent during the campaign; and generate the template comprising one or more shifts identifying resources to schedule based on the number of resources needed to handle at least one of (1) the number of inbound communications expected to be received during the campaign and (2) the number of outbound communications needed to be sent during the campaign.

14. The system of claim 13, wherein the resources to schedule comprise at least one of agents and communication trunks.

15. The system of claim 13, wherein the first channel of communication comprises one of a text message, an email, and a direct mail and the second channel of communication comprises one of a telephone call, a text message, an email, and a direct mail.

16. The system of claim 15, wherein the workforce management component is further configured to generate a schedule based on the template, the schedule identifying actual resources scheduled to be used during the campaign.

17. The system of claim 16 further comprising a campaign monitoring component configured to:
  identify the actual resources from the schedule; and
  verify resources currently being used to handle at least one of outbound and inbound communications for the campaign based on the actual resources identified from the schedule to identify any discrepancies between the resources currently being used to handle at least one of the outbound and inbound communications for the campaign and the actual resources identified from the schedule.

18. The system of claim 17, wherein the campaign monitoring component is further configured to:
  receive a message from a contact device about an outbound communication to send for the campaign or an inbound communication received for the campaign;
  select a particular resource from the resources currently being used to handle at least one of outbound and inbound communications for the campaign; and
  send a message to the contact device advising the contact device to send the outbound communication using the particular resource or to transfer the inbound communication to the particular resource.

* * * * *